US011774971B2

(12) United States Patent
Tyers

(10) Patent No.: US 11,774,971 B2
(45) Date of Patent: *Oct. 3, 2023

(54) AUTOMATIC LOCATION PLACEMENT SYSTEM

(71) Applicant: MAID IP Holdings Pty/Ltd, Perth (AU)

(72) Inventor: Bradley Tyers, Currambine (AU)

(73) Assignee: MAID IP HOLDINGS P/L, Perth (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,031

(22) Filed: Jan. 6, 2023

(65) Prior Publication Data

US 2023/0152806 A1 May 18, 2023

Related U.S. Application Data

(63) Continuation of application No. 17/865,825, filed on Jul. 15, 2022, now Pat. No. 11,556,130, and a
(Continued)

(51) Int. Cl.
*G05D 1/02* (2020.01)
*G01S 19/13* (2010.01)
(Continued)

(52) U.S. Cl.
CPC .......... *G05D 1/0206* (2013.01); *B63H 25/04* (2013.01); *G01C 21/203* (2013.01); *G01S 19/13* (2013.01);
(Continued)

(58) Field of Classification Search
CPC .......... B63H 5/08; B63H 21/21; B63H 25/42; B63H 2025/42; B63H 21/00; B63H 25/04;
(Continued)

(56) References Cited

U.S. PATENT DOCUMENTS 3,594,716 A 7/1971 Waterman
3,673,553 A 6/1972 Miura
(Continued)

FOREIGN PATENT DOCUMENTS

AU 2014202813 B2 3/2018
AU 2021261974 B2 5/2022
(Continued)

OTHER PUBLICATIONS

Notice of Allowance dated Aug. 18, 2022, in U.S. Appl. No. 17/233,666 of Bradley Tyers, filed Apr. 19, 2021, 17 pages.
(Continued)

*Primary Examiner* — Daniel V Venne
(74) *Attorney, Agent, or Firm* — BLUESHIFT IP, LLC; Robert Plotkin

(57) ABSTRACT

A method of automatically moving, by an automatic location placement system, a marine vessel includes receiving, by a central processing unit, from a vision ranging photography system, at least one optical feed including data providing a mapping of an environment surrounding a marine vessel. The method includes displaying, by the central processing unit, on a touch screen monitor, the mapping of the environment. The method includes receiving, by the central processing unit, from the touch screen monitor, target location data. The method includes directing, by the central processing unit, at least one element of a propulsion system of the marine vessel, to move the marine vessel to the targeted location, using the mapping.

24 Claims, 21 Drawing Sheets

Related U.S. Application Data continuation of application No. 17/697,266, filed on Mar. 17, 2022, now Pat. No. 11,480,965, which is a continuation of application No. 17/233,666, filed on Apr. 19, 2021, now Pat. No. 11,531,342, which is a continuation of application No. 16/398,721, filed on Apr. 30, 2019, now Pat. No. 11,029,686, which is a continuation of application No. 15/717,526, filed on Sep. 27, 2017, now Pat. No. 10,281,917, which is a continuation of application No. 15/479,502, filed on Apr. 5, 2017, now Pat. No. 9,778,657, which is a continuation of application No. PCT/IB2017/000325, filed on Mar. 29, 2017, said application No. 15/479,502 is a continuation of application No. 14/904,086, filed on Jan. 9, 2016, now abandoned, which is a continuation-in-part of application No. PCT/US2014/040227, filed on May 30, 2014, which is a continuation of application No. 13/939,052, filed on Jul. 10, 2013, now Pat. No. 8,622,778, which is a continuation-in-part of application No. 13/590,901, filed on Aug. 21, 2012, now abandoned, which is a continuation-in-part of application No. 12/950,990, filed on Nov. 19, 2010, now abandoned.

(60) Provisional application No. 62/314,625, filed on Mar. 29, 2016.

(51) Int. Cl.
  *G01C 21/20* (2006.01)
  *B63H 25/04* (2006.01)
  *B63B 21/00* (2006.01)

(52) U.S. Cl.
  CPC ........ *B63B 21/00* (2013.01); *B63H 2025/045* (2013.01)

(58) Field of Classification Search
  CPC ... B63H 2025/45; G01S 13/9307; G01S 7/22; G01S 19/13; G01D 1/0206; G01C 21/203
  USPC ........ 440/1, 2, 3, 86; 701/1, 2, 21, 200, 300
  See application file for complete search history.

(56) References Cited

U.S. PATENT DOCUMENTS

| | | |
|---|---|---|
| 3,690,767 A | 9/1972 | Missio |
| 3,707,717 A | 12/1972 | Frielinghaus |
| 3,754,247 A | 8/1973 | Hansford |
| 3,772,693 A | 11/1973 | Allard |
| 4,063,240 A | 12/1977 | Isbister |
| 4,216,538 A | 8/1980 | Tomlinson |
| 4,510,496 A | 4/1985 | Ross |
| 4,679,152 A | 7/1987 | Perdue |
| 5,274,378 A | 12/1993 | Oconner |
| 5,432,515 A | 7/1995 | Oconner |
| 5,490,075 A | 2/1996 | Howard |
| 5,781,147 A | 7/1998 | Elliott |
| 6,064,330 A | 5/2000 | Elliott |
| 6,249,241 B1 | 6/2001 | Jordan |
| 6,273,771 B1 | 8/2001 | Buckley |
| 6,434,512 B1 | 8/2002 | Discenzo |
| 6,442,476 B1 | 8/2002 | Poropat |
| 6,577,932 B1 | 6/2003 | Van Beurden |
| 6,611,737 B1* | 8/2003 | El-Tahan ............ G05D 1/0206 701/472 |
| 6,677,889 B2 | 1/2004 | Van Rees |
| 6,707,414 B2 | 3/2004 | Van Rees |
| 6,978,729 B2 | 12/2005 | Bertetti |
| 6,995,662 B2 | 2/2006 | Wortsmith |
| 7,021,231 B2 | 4/2006 | Smart |
| 7,047,114 B1 | 5/2006 | Rogers |
| 7,124,022 B2 | 10/2006 | Carmichael |
| 7,315,274 B2 | 1/2008 | Fossum |
| 7,389,735 B2 | 6/2008 | Kaji |
| 7,505,364 B2 | 3/2009 | Polvani |
| 7,561,886 B1 | 7/2009 | Gonring |
| 7,690,458 B2 | 4/2010 | Ueda |
| 7,706,305 B2 | 4/2010 | Ninomiya |
| 7,940,206 B2 | 5/2011 | Nohara |
| 8,155,811 B2 | 4/2012 | Noffsinger |
| 8,180,507 B2 | 5/2012 | Dokken |
| 8,346,480 B2 | 1/2013 | Trepagnier |
| 8,442,710 B2 | 5/2013 | Glaeser |
| 8,510,046 B2 | 8/2013 | Kabel |
| 8,612,085 B2 | 12/2013 | Flohr |
| 8,622,778 B2 | 1/2014 | Tyers |
| 8,744,748 B2 | 6/2014 | Gupta |
| 8,849,483 B2 | 9/2014 | Kuwata |
| 8,965,682 B2 | 2/2015 | Tangirala |
| 9,232,008 B2 | 1/2016 | Hara |
| 9,297,256 B2 | 3/2016 | Nettleton |
| 9,644,959 B2 | 5/2017 | Stephens |
| 9,704,084 B2 | 7/2017 | Nordlund |
| 9,764,807 B2 | 9/2017 | Frisbie |
| 9,778,657 B2 | 10/2017 | Tyers |
| 9,857,794 B1 | 1/2018 | Jarrell |
| 9,939,819 B2 | 4/2018 | Lim |
| 9,969,478 B2 | 5/2018 | Mazin |
| 10,259,555 B2 | 4/2019 | Ward |
| 10,281,917 B2 | 5/2019 | Tyers |
| 10,322,787 B2 | 6/2019 | Ward |
| 10,324,468 B2 | 6/2019 | Arbuckle |
| 10,429,845 B2 | 10/2019 | Arbuckle |
| 10,746,553 B2* | 8/2020 | Robideaux ............ G01C 21/20 |
| 11,029,686 B2 | 6/2021 | Tyers |
| 11,263,886 B2 | 3/2022 | Adachi |
| 11,480,965 B2 | 10/2022 | Tyers |
| 11,531,342 B2 | 12/2022 | Tyers |
| 11,556,130 B2 | 1/2023 | Tyers |
| 2002/0184640 A1 | 12/2002 | Schnee |
| 2003/0137445 A1 | 7/2003 | Van Rees |
| 2004/0064249 A1 | 4/2004 | Lacey |
| 2005/0259033 A1 | 11/2005 | Levine |
| 2007/0023215 A1 | 2/2007 | Ueda |
| 2007/0073451 A1 | 3/2007 | Kuhls |
| 2007/0073454 A1 | 3/2007 | Kaji |
| 2007/0078575 A1 | 4/2007 | Wilson |
| 2007/0171042 A1 | 7/2007 | Metes |
| 2008/0033603 A1 | 2/2008 | Gensler |
| 2008/0036593 A1 | 2/2008 | Rose-Pehrsson |
| 2008/0289558 A1 | 11/2008 | Montgomery |
| 2009/0096867 A1 | 4/2009 | Skjelten |
| 2009/0271054 A1 | 10/2009 | Dokken |
| 2010/0068950 A1 | 3/2010 | Lundgren |
| 2010/0168942 A1 | 7/2010 | Noffsinger |
| 2011/0022316 A1 | 1/2011 | Bendito Vallori |
| 2011/0172858 A1 | 7/2011 | Gustin |
| 2012/0072059 A1 | 3/2012 | Glaeser |
| 2012/0129410 A1 | 5/2012 | Tyers |
| 2013/0080044 A1 | 3/2013 | Tyers |
| 2013/0297104 A1 | 11/2013 | Tyers |
| 2013/0346017 A1 | 12/2013 | Stephens |
| 2014/0022107 A1 | 1/2014 | Kim |
| 2014/0067220 A1 | 3/2014 | Seiler |
| 2016/0187883 A1 | 6/2016 | Tyers |
| 2016/0223336 A1 | 8/2016 | Robideaux |
| 2016/0252907 A1 | 9/2016 | Parkinson |
| 2017/0045887 A1 | 2/2017 | Mazin |
| 2017/0205829 A1 | 7/2017 | Tyers |
| 2018/0017974 A1 | 1/2018 | Tyers |
| 2019/0258258 A1 | 8/2019 | Tyers |
| 2020/0369351 A1 | 11/2020 | Behrendt |
| 2021/0088667 A1 | 3/2021 | Heling |
| 2021/0247767 A1 | 8/2021 | Tyers |

(56) References Cited

U.S. PATENT DOCUMENTS

| | | | |
|---|---|---|---|
| 2022/0206496 | A1 | 6/2022 | Tyers |
| 2022/0357745 | A1 | 11/2022 | Tyers |

FOREIGN PATENT DOCUMENTS

| | | | |
|---|---|---|---|
| CN | 1405578 | A | 3/2003 |
| CN | 100534859 | C | 2/2007 |
| CN | 101214851 | A | 7/2008 |
| CN | 101342939 | A | 1/2009 |
| CN | 102621547 | A | 8/2012 |
| CN | 103129720 | A | 6/2013 |
| CN | 103507938 | A | 1/2014 |
| CN | 104249809 | A | 12/2014 |
| CN | 104276265 | A | 1/2015 |
| CN | 204473093 | U | 7/2015 |
| CN | 103434610 | B | 1/2016 |
| CN | 105575185 | A | 5/2016 |
| CN | 105575185 | B | 12/2017 |
| CN | 108698681 | A | 10/2018 |
| CN | 108698681 | B | 8/2022 |
| EP | 870291 | B1 | 10/2001 |
| EP | 1873052 | | 1/2008 |
| EP | 1873052 | B1 | 6/2009 |
| EP | 2610636 | | 7/2013 |
| EP | 2610636 | A1 | 7/2013 |
| EP | 2919182 | A2 | 9/2015 |
| EP | 3026458 | A1 | 6/2016 |
| EP | 3408720 | A1 | 12/2018 |
| EP | 3436347 | A1 | 2/2019 |
| EP | 2824528 | | 3/2019 |
| GB | 1384647 | A | 2/1975 |
| GB | 2441802 | A | 3/2008 |
| GB | 2511731 | A | 9/2014 |
| GB | 201301488 | A | 9/2014 |
| JP | 1987034085 | A | 2/1987 |
| JP | H06286694 | A | 10/1994 |
| JP | H07270527 | | 10/1995 |
| JP | H1089999 | A | 4/1998 |
| JP | H11115886 | A | 4/1999 |
| JP | 2005028891 | A | 2/2005 |
| JP | 2005515117 | A | 5/2005 |
| JP | 2005180949 | A | 7/2005 |
| JP | 2005212693 | A | 8/2005 |
| JP | 2007106397 | A | 4/2007 |
| JP | 2008201225 | A | 9/2008 |
| JP | 2011169801 | A | 9/2011 |
| JP | 2012528417 | A | 11/2012 |
| JP | 2013103526 | A | 5/2013 |
| JP | 2014191668 | A | 10/2014 |
| JP | 2017159887 | A | 9/2017 |
| JP | 2021062867 | A | 4/2021 |
| KR | 1020060072293 | A | 6/2006 |
| KR | 101043055 | | 6/2011 |
| KR | 20140077509 | A | 6/2014 |
| KR | 101683274 | | 6/2016 |
| KR | 102418713 | B1 | 11/2022 |
| TW | 200930985 | A | 7/2009 |
| WO | 02075251 | A1 | 9/2002 |
| WO | 2006062416 | | 6/2006 |
| WO | 2006062416 | A1 | 6/2006 |
| WO | 2006110973 | A1 | 10/2006 |
| WO | 2008121130 | A2 | 10/2008 |
| WO | 2010020573 | A1 | 2/2010 |
| WO | 2010141772 | A1 | 12/2010 |
| WO | 2012068425 | A1 | 5/2012 |
| WO | 2014142403 | | 9/2014 |
| WO | 2015005986 | A1 | 1/2015 |
| WO | 2016112708 | A1 | 7/2016 |
| WO | 2016112714 | | 7/2016 |
| WO | 2016112714 | A1 | 7/2016 |
| WO | 2017051438 | A1 | 3/2017 |
| WO | 2017136014 | | 8/2017 |
| WO | 2017168234 | | 10/2017 |
| WO | 2019231464 | A1 | 12/2019 |

OTHER PUBLICATIONS

Notice of Allowance dated Jul. 25, 2022 in U.S. Appl. No. 17/697,266 of Bradley Tyers, filed Mar. 17, 2022, 16 pages.
Notice of Allowance dated Aug. 17, 2022, in Korean patent application No. 10-2022-7022850, 3 pages.
Non-Final Office Action dated Sep. 2, 2022, in U.S. Appl. No. 17/865,825 of Bradley Tyers, filed Jul. 15, 2022, 6 pages.
Notice of Allowance dated Sep. 15, 2022, in U.S. Appl. No. 17/865,825 of Bradley Tyers, filed Jul. 15, 2022, 8 pages.
Invitation to Respond to Written Opinion dated Oct. 3, 2022, in Singapore patent application No. 10202112206Q, 10 pages.
Acceptance of Application and Examination Report dated Sep. 6, 2022, in United Arab Emirates patent application No. P6001029/2018, 4 pages.
Notification on Grant of the Patent Right for Invention dated Jan. 13, 2023, in Chinese patent application No. 2021113190216, 7 pages.
MAID Technologies Inc. "Every Boat Needs a MAID", Sep. 20, 2016, 1 page, online <https://mobile.twitter.com/MAIDsystems/status/777950871812399104/photo/1> and <http://maidsystems.com/> Accessed Mar. 10, 2017.
Wikipedia "Dynamic positioning", available online at https://en.wikipedia.org/wiki/Dynamic_positioning, accessed May 16, 2018, 12 pages.
Volvo Penta, "Dynamic Positioning System", posted to YouTube.com on May 29, 2012, video duration 1 min 17 sec, available online at https://www.youtube.com/watch?v=Ks4lsblg29E, accessed May 16, 2018.
Nautic Expo "Dynamic positioning systems", available online at http://www.nauticexpo.com/boal-manufacturer/dynamic-positioning-system-19975.html, website accessed May 16, 2018, 9 pages.
Stephens et al., "Integration of an Inertial Navigation System and DP" presented at Dynamic Positioning Conference, Oct. 7-8, 2008; 15 pages.
Bloisi et al., "Integrated Visual Information for Maritime Surveillance" 2015, 22 pages.
Elkins, L., "The Autonomous maritime Navigation (AMN) project: Field tests, Autonomous and cooperative behaviors, data fusion, sensors, and vehicles", vol. 27, Np. 6, Special Issue: State of the Art in Maritime Autonomous Surface and Underwater Vehicles, Part 1, pp. 790-818 (Nov./Dec. 2010).
Coley, "Wärtsilä's Ambitious Vision of a Digital Future", MarineLink website, Nov. 27, 2017; available online at https://www.marinelink.com/news/ambitious-wrtsils-digital431582, May 16, 2018, 6 pages.
Howard, "Wärtsilä Tests Remote Control Ship Operating Capability" MarineLink website, Sep. 1, 2017, available online at https://www.marinelink.com/news/capability-operating428998, accessed May 16, 2018, 7 pages.
Fernández et al., "SmartPort: A Platform for Sensor Data Monitoring in a Seaport Based on FIWARE," Sensors Journal, Mar. 22, 2016; 16, 417; doi: 10.3390/s16030417, 24 pages.
Russell "Integrating INS and GNSS Sensors to Provide Reliable Surface Positioning" presented at Dynamic Positioning Conference, Oct. 9-10, 2012; 12 pages.
Walter "Scientists Develop 3D Printed, Self-Driving Boats", R&D Magazine, available online at https://www.rdmag.com/article/2018/05/scientists-develop-3d-printed-self-driving-boats?et_cid=6352315&et_rid=45535253&location=top&et_cid=6352315&et_rid=455, May 25, 2018, 5 pages.
Shuzhi Sam Ge et al., "Dynamic Positioning System for Marine Vessels", available online at http://ieeecss.org/sites/ieeecss.org/files/documents/IoCT-Part2-18MarineVessels-HR.pdf, accessed Dec. 20, 2017, 2 pages.
Final Rejection dated Nov. 23, 2018 for U.S. Appl. No. 15/717,526 of Bradley Tyers, filed Sep. 27, 2017, 14 pages.
A. Lebbad et al., "Design and Development of an Autonomous USV for RobotX," Team WORX: USA, The Inaugural Maritime Challenge, Singapore 2014, 15 pages.
Andrew Webb et al., "Development and Testing of the TopCat Autonomous Surface Vessel for the Maritime RobotX Challenge 2016", RobotX Forum, 2016, 12 pages.

(56) References Cited

OTHER PUBLICATIONS

Daniel Pickem et al., "Captain Hindsight: An Autonomous Surface Vessel", Georgia Institute of Technology, Available online Jul. 17, 2012 at <<https://robonation.org/app/uploads/sites/3/2019/10/GT_RB12_Paper.pdf>>, Aug. 2011, 10 pages.
Extended European Search Report dated Oct. 14, 2019, in European Patent Application No. 17773371.4, 8 pages.
Final Rejection dated Jun. 19, 2020 for U.S. Appl. No. 16/398,721 of Bradley Tyers, filed Apr. 30, 2019, 10 pages.
First Office Action dated May 27, 2020, in Chinese patent application No. 201780014228.8, 21 pages.
Non-Final Rejection dated Jul. 31, 2020 in U.S. Appl. No. 16/398,721 of Bradley Tyers, filed Apr. 30, 2019, 12 pages.
Non-Final Rejection dated Mar. 9, 2020 in U.S. Appl. No. 16/398,721 of Bradley Tyers, filed Apr. 30, 2019, 25 pages.
Villanova University Journal Paper, "7th Annual AUVSI RoboBoat Competition", Available online at << https://robonation.org/app/uploads/sites/3/2019/10/Villanova_RB14_Paper.pdf<<, Jul. 8, 2014, 9 pages.
Written Opinion issued by the Intellectual Property Office of Singapore in Singapore Patent Application No. 11201806253P dated Dec. 18, 2019, 5 pages.
Final Rejection dated Sep. 21, 2020 for U.S. Appl. No. 16/398,721 of Bradley Tyers, filed Apr. 30, 2019, 15 pages.
Notification of Reasons for Refusal dated Sep. 1, 2020, in Japanese patent application No. 2018-551247, 11 pages.
Written Opinion issued by the Intellectual Property Office of Singapore in Singapore Patent Application No. 11201806253P dated Oct. 17, 2020, 6 pages.
Non-Final Rejection dated Jan. 8, 2021 in U.S. Appl. No. 16/398,721 of Bradley Tyers, filed Apr. 30, 2019, 15 pages.
First Examination Report dated Jan. 25, 2021, by the Korean Intellectual Property Office in patent application 10-2018-7030418, 22 pages.
Notice of Allowance dated Feb. 18, 2021 in U.S. Appl. No. 16/398,721 of Bradley Tyers, filed Apr. 30, 2019, 7 pages.
Communication pursuant to Article 94(3) EPC, dated Jul. 7, 2021, in European Patent Application No. 17773371.4, 4 pages.
Decision to Grant dated Nov. 25, 2021, by the Korean Intellectual Property Office in patent application 10-2018-7030418, 3 pages.
Examination Report issued by the Intellectual Property Office of Singapore in Singapore Patent Application No. 11201806253P dated Oct. 8, 2021, 5 pages.
Examination Report dated Jan. 11, 2022, in Australian patent application No. 2021261974, 3 pages.
Mohammad Omar Khyam, "Highly Accurate Ultrasonic Positioning and Tracking Systems," Doctorate of Philosophy Thesis, School of Engineering and Information Technology, The University of New South Wales, Canberra, Australia, Aug. 2014, 6 pages.
Notice of Allowance dated Jul. 6, 2021, in Japanese patent application No. 2018-551247, 6 pages.
Notice of Eligibility for Grant issued by the Intellectual Property Office of Singapore in Singapore Patent Application No. 11201806253P dated Oct. 12, 2021, 1 page.
Notification of Reasons for Refusal dated Nov. 30, 2021, in Japanese patent application No. 2021-013573, 8 pages (English Translation).
Second Office Action dated Apr. 2, 2021, in Chinese patent application No. 201780014228.8, 15 pages (English translation included).
Sun Jian et al., "Multi-Region Coverage Method Based on Cost Map and Minimal Tree for Mobile Robot", vol. 37, Issue 4, Jul. 2015, pp. 435-442 (English abstract included).
Third Office Action dated Dec. 15, 2021, in Chinese patent application No. 201780014228.8, 17 pages (English translation included).
First Substantive Examination Report and Search Report dated Feb. 11, 2022, in United Arab Emirates patent application No. P6001029/2018, 9 pages.
Decision of Patent dated Apr. 5, 2022, in Korean patent application No. 10-2022-7006070, 3 pages.
Communication pursuant to Article 94(3) EPC, dated Apr. 1, 2022, in European Patent Application No. 17773371.4, 5 pages.
Notice of Acceptance dated May 2, 2022, in Australian patent application No. 2021261974, 3 pages.
Non-Final Rejection dated May 13, 2022 in U.S. Appl. No. 17/697,266 of Bradley Tyers, filed Mar. 17, 2022, 6 pages.
Notification on Grant of the Patent Right for Invention dated May 7, 2022, in Chinese patent application No. 201780014228.8, 7 pages (English translation included).
Final Notification of Reasons for Refusal dated Jun. 28, 2022, in Japanese patent application No. 2021-013573, 8 pages (English Translation).
Non-Final Office Action dated Jul. 15, 2022, in U.S. Appl. No. 17/233,666 of Bradley Tyers, filed Apr. 19, 2021, 36 pages.
First Office Action dated Jun. 28, 2022, in Chinese patent application No. 2021113190216, 15 pages.

\* cited by examiner

AUTOMATIC LOCATION PLACEMENT SYSTEM

CROSS-REFERENCE TO RELATED APPLICATIONS

This application is a continuation of U.S. patent application Ser. No. 17/865,825, filed on Jul. 15, 2022, entitled "Automatic Location Placement System," which application is a continuation of U.S. patent application Ser. No. 17/697,266, filed on Mar. 17, 2022, entitled "Automatic Location Placement System," which application is a continuation of U.S. patent application Ser. No. 17/233,666, filed on Apr. 19, 2021, entitled "Automatic Location Placement System," which application is a continuation of U.S. patent application Ser. No. 16/398,721, filed on Apr. 30, 2019, entitled, "Automatic Location Placement System," now U.S. Pat. No. 11,029,686, issued on Jun. 8, 2021; which application is a continuation of U.S. patent application Ser. No. 15/717,526, filed on Sep. 27, 2017, entitled, "Automatic Location Placement System," now U.S. Pat. No. 10,281,917, issued on May 7, 2019; which is a continuation of U.S. patent application Ser. No. 15/479,502, filed on Apr. 5, 2017, entitled, "Automatic Location Placement System," now U.S. Pat. No. 9,778,657 B2, issued on Oct. 3, 2017; which is a continuation of International Pat. App. No. PCT/IB2017/000325, filed on Mar. 29, 2017, entitled, "An Automatic Location Placement System"; which claims benefit of priority to U.S. Pat. App. No. 62/314,625, filed on Mar. 29, 2016, entitled, "Automatic Location Placement System". U.S. patent application Ser. No. 15/479,502 filed on Apr. 5, 2017, entitled, "Automatic Location Placement System," now U.S. Pat. No. 9,778,657 B2, issued on Oct. 3, 2017; which is a continuation of U.S. patent application Ser. No. 14/904,086, filed on Jan. 9, 2016, entitled, "A Programmable Automatic Docking System"; which is a U.S. National Stage Entry of International Pat. App. No. PCT/US2014/040227, filed on May 30, 2014, entitled "A Programmable Automatic Docking System"; which is a continuation of U.S. patent application Ser. No. 13/939,052, filed on Jul. 10, 2013, entitled "Programmable Automatic Docking System," now U.S. Pat. No. 8,622,778 B2, issued on Jan. 7, 2014; which is a continuation-in-part of U.S. patent application Ser. No. 13/590,901, filed on Aug. 21, 2012, entitled "Automatic Docking System"; which is a continuation-in-part of U.S. patent application Ser. No. 12/950,990, filed on Nov. 19, 2010.

BACKGROUND

The methods and systems described herein relates generally to automatic docking and marine vessel collision avoidance systems preferably for a marine vessel, and more particularly to an automatic location placement system between a powered marine vessel and a dock or external object.

To maneuverer a large marine vessel to a desired location is a precise operation, which may cause damage to the marine vessel and the surrounding areas when relying on the judgment of an operator. Maintaining the final location of the marine vessel conventionally requires the aid of multiple securing devices. Dangerous weather conditions such as wind, water currents, fog and darkness, highly increase the risk associated with the moving operation.

Previous docking systems have typically required additional aids to assist in measuring the effects of these variables in order to provide visual aids to assist an operator's judgment to manually move the marine vessel to a desired location. However, the maneuvering of a marine vessel in congested areas typically requires a skilled operator and many assistants to assist with maneuvering. Conventional systems do not typically provide interactive systems for viewing an area surrounding a marine vessel or for receiving instructions for maneuvering the marine vessels via an interactive system without human assistance. Furthermore, the larger a marine vessel, the greater the risk that exists during conventional maneuvering, especially in a congested area, thereby resulting in a greater need for skilled operators, local harbor pilots, multiple assistants, and tugboats.

SUMMARY

The methods and systems described herein relate generally to an automatic location placement system between a powered marine vessel and a dock or external object. An automatic location placement system may incorporate a touch screen interactive monitor displaying an overlay of the geometries of the situation at hand over an optical feed from a vision system enabling the operator to select a targeted location on the interactive monitor.

In one aspect, an automatic location placement system includes a vision ranging photograph system generating at least one optical feed; at least one infrared vision system; at least one ranger laser scanner; at least one inertial measurement unit; at least one global positioning system unit; a touch screen control monitor; a propulsion system of a marine vessel including at least one thruster, at least one drive system, and at least one actuator; and a central processing unit located on the marine vessel and operatively connected to the propulsion system, the central processing unit: (i) receiving, from the vision ranging photography system, the at least one optical feed, the feed including data providing a mapping of an environment surrounding the marine vessel; (ii) displaying, on a touch screen monitor, the mapping of the environment; (iii) receiving, from the touch screen monitor, target location data; and (iv) directing, by the central processing unit, at least one element of the propulsion system of the marine vessel, to move the marine vessel to the targeted location, using the mapping.

In another aspect, a method of automatically moving, by an automatic location placement system, a marine vessel includes receiving, by a central processing unit, from a vision ranging photography system, at least one optical feed including data providing a mapping of an environment surrounding a marine vessel; displaying, by the central processing unit, on a touch screen monitor, the mapping of the environment; receiving, by the central processing unit, from the touch screen monitor, target location data; and directing, by the central processing unit, at least one element of a propulsion system of the marine vessel, to move the marine vessel to the targeted location, using the mapping.

BRIEF DESCRIPTION OF THE SEVERAL VIEWS OF THE DRAWINGS

Certain objects, aspects, features, and advantages of the disclosure will become more apparent and better understood by referring to the following description taken in conjunction with the accompanying drawings, in which.

DETAILED DESCRIPTION

Figure 1:
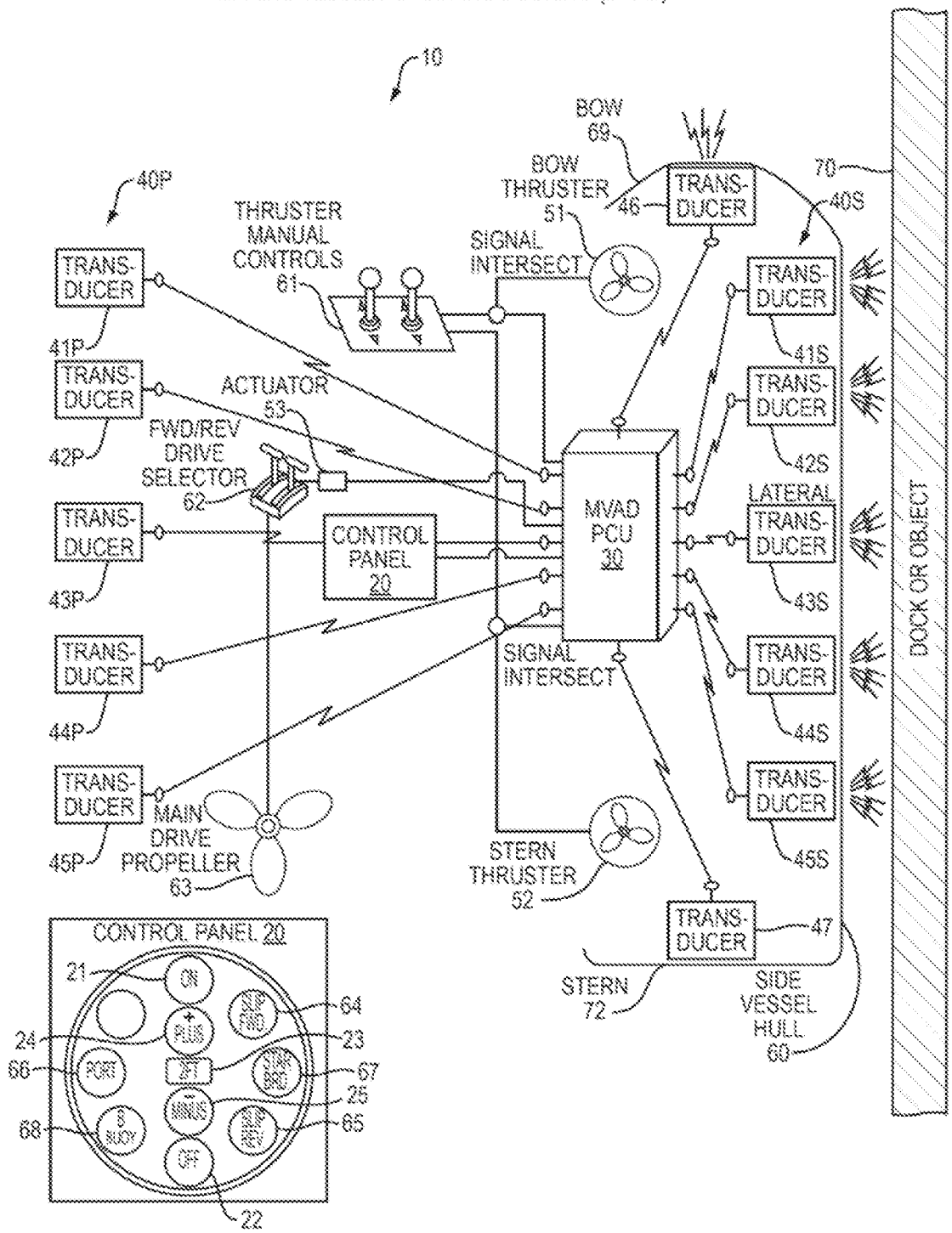
FIG. 1 is a diagrammatic perspective view of a programmable automatic docking system, wherein the system includes a plurality of port and starboard transducers, along with a pair of lateral position transducers on a marine vessel, and a programmable control panel to initiate a variety of automatic functions through a processor control unit designed to execute the selected automatic functions.

For explanatory purposes only, this section refers to a marine vessel and an external object when describing both a marine vessel's port and starboard operations. Furthermore, the only difference in operation between "port" or "starboard" operation is the selection of a "port" or "starboard" button on a control panel. This selection determines the activation of a set of "port" or "starboard" transducers and "port" or "starboard" direction of the marine vessel's sideways movement. Lastly, FIGS. 1-4 illustrate in detail the starboard side of a marine vessel for illustrative purposes only; however one of skill in the art may easily understand the operation from a port side of the marine vessel.

One object of the instant invention is to provide a programmable automatic docking system, wherein the programmable automatic docking system includes a programmable processor control unit ("PCU") primarily for automatically docking and navigating a marine vessel to a final position in relation to an external object, including, but not limited to, a dock. Furthermore, the programmable automatic docking system operates independently and without the use or requirement of any human operators upon initiation of the programmable automatic docking system.

Another object of the instant invention is to provide a programmable automatic docking system that possesses the capability to operate effectively in adverse weather conditions without the requirement or need for human operators to carryout docking operations.

Another object of the instant invention is to provide a programmable automatic docking system that removes the risk of damage to the marine vessel and/or the external object by enabling the marine vessel to automatically move sideways towards the external object upon initiation of the programmable automatic docking system and to a maintain a pre-selected position from the external object.

Another object of the instant invention is to provide a programmable automatic docking system, which comprises a plurality of transducers to detect and transmit a set of distance information between the marine vessel and an external object.

Another object of the instant invention is to provide a programmable automatic docking system, wherein the set of distance information provides feedback to the processor control unit to enable a plurality of thrusters in conjunction with a main drive system on the marine vessel, to drive the marine vessel in a sideways, fore and aft direction toward the external object in a controlled lateral path, and velocity.

Another object of the instant invention is to provide a programmable automatic docking system that maintains the location of the marine vessel once the marine vessel has reached a pre-selected position relative to the external object and to maintain that position indefinitely regardless of the wind and water currents while the system is in operation.

Another object of the instant invention is to provide a programmable automatic docking system that automatically position's a marine vessel into a slip location regardless of wind and water currents.

Another object of the instant invention is to provide a programmable automatic docking system that maintains the pre-selected position of the marine vessel without the aid of multiple ropes and fenders indefinitely while the programmable automatic docking system is in operation.

Yet another object of the instant invention is to provide a programmable automatic docking system that includes a programmable processor control unit to enable the marine vessel to remain at a pre-selected distance alongside an external object.

Yet another object of the instant invention is to provide a programmable automatic docking system that includes a programmable processor control unit to enable efficient operation regardless of the length of the marine vessel.

In brief, the programmable automatic docking system, once engaged, operates completely automatic without human operators, by controlling the precise movement and location of a marine vessel in relation to an external object until the marine vessel reaches a final pre-selected position, and then maintains the final position of the marine vessel while the programmable automatic docking system is in operation regardless of wind and water currents.

FIG. 1 illustrates a diagrammatic perspective view of a programmable automatic docking system 10 possessing an integrated interactive proximity sensing feedback of a marine vessel's 60 direction, lateral position, and velocity, along with automatic control of the docking operations and other associated functions for the marine vessel 60 once the programmable automatic docking system 10 is engaged.

In one embodiment, the programmable automatic docking system 10 comprises a set of port side transducers 40P and a set of starboard side transducers 40S. Preferably the set of port side transducers 40P further comprises four distance sensing transducers 41P, 42P, 44P and 45P, and one lateral port side position transducer 43P, and the set of starboard side transducers 40S further comprises four distance sensing transducers 41S, 42S, 44S and 45S, and one lateral starboard side position transducer 43S. In one embodiment, the set of port side transducers 40P and the set of starboard side transducers 40S provide distance, velocity, and position information between five spaced locations on the port and starboard sides of the marine vessel 60.

In yet another embodiment of the programmable automatic docking system 10, the set of port side transducers 40P comprise a pair of distance sensing transducers 41P and 42P located on the port fore side of the marine vessel 60, and a pair of distance sensing transducers 44P and 45P located on the port aft side of the marine vessel 60, wherein each port side transducers 41P, 42P, 44P and 45P detects and transmits a set of distance and velocity information relating to the distance between the port side of the marine vessel 60 and an external object 70; in one embodiment, the external object 70, includes, but is not limited to a dock, another marine vessel, or other similar structure. Additionally, the lateral port side position transducer 43P establishes a lateral position from the port side of the marine vessel 60 in relation to a precise lateral reference point on the port external object 70. In this embodiment, the precise lateral reference point detected is a random reference point located at ninety degrees to the side of the marine vessel 60 on the external object 70; it may also transmit any lateral movement of the marine vessel 60 to a programmable processor control unit 30 (see below discussion).

In yet another embodiment of the programmable automatic docking system 10, the set of starboard side transducers 40S comprise a pair of distance sensing transducers 41S and 42S located on the starboard fore side of the marine vessel 60, and a pair of distance sensing transducers 44S and 45S located on the starboard aft side of the marine vessel 60, wherein each starboard side transducers 41S, 42S, 44S and 45S detect and transmit a set of distance and velocity information relating to the distance between the starboard side of the marine vessel 60 and an external object 70; in one embodiment, the external object 70, includes, but is not limited to a dock, or other similar structure. Additionally, the lateral starboard side position transducer 43S establishes a lateral position from the starboard side of the marine vessel 60 in relation to a precise lateral reference point on the starboard external object 70.

The programmable automatic docking system 10 further comprises a propulsion system which includes a bow thruster 51 and a stern thruster 52, wherein each respective thruster 51, and 52 drives the marine vessel 60 in a sideways direction in relation to the orientation of the external object 70, thereby aligning and subsequently maintaining the side of the marine vessel 60 at a final pre-selected distance from the external object 70. Moreover, the propulsion system further includes a forward/reverse drive selector 62, and a main drive propeller 63 that works in conjunction with the bow thruster 51 and stern thruster 52.

Additionally, the programmable automatic docking system 10 includes a programmable processor control unit ("PCU") 30 which further comprises an automatic processor operating in real time to communicate and transmit the set of distance and velocity information provided by the set of port side transducers 40P and starboard side transducers 40S and the propulsion system, wherein each element of the propulsion system may operate independently or together as determined by the programmable processor control unit 30.

In one embodiment, the set of port side transducers 40P are preferably used to transmit distance, position and velocity information with respect to the port side of the marine vessel 60 in relation to the port side external object 70 to the programmable processor control unit 30. The set of starboard side transducers 40S are preferably used to transmit distance, position and velocity information with respect to the starboard side of the marine vessel 60 in relation to the starboard side external object 70 to the programmable processor control unit 30.

Additionally, the programmable automatic docking system 10 comprises a control panel 20, wherein the control panel 20 allows for the execution of a series of defined functions by the programmable automatic docking system 10 through the selection of a specific input. In one embodiment, the control panel 20 includes an on button 21 to activate the programmable automatic docking system 10 and an off button 22 to deactivate the programmable automatic docking system 10. Furthermore, the control panel 20 comprises a port button 66 and a starboard button 67, wherein in one embodiment, when the port button 66 is selected on the control panel 20, the set of port side transducers 40P wirelessly transmit the set of distance, position and velocity information which includes real-time distance, position and velocity measurements of the port side of the marine vessel 60 in relation to the external object 70 to the programmable processor control unit 30. Upon receiving the set of distance and velocity information, the programmable processor control unit 30 engages the bow thruster 51 in response to the real-time distance and velocity information provided by the set of port fore side transducers 41P and 42P during docking operations.

In yet another embodiment, a distance setting may be entered relating to a final pre-selected distance between the marine vessel 60 and the external object 70 by selecting a plus button 24 or minus button 25 on the control panel 20. The final pre-selected distance setting is then transmitted to the programmable processor control unit 30 for use once the programmable automatic docking system 10 is in operation. As stated above, the system may be engaged by selecting the "on" button 21 on the control panel 20 and disengaged by selecting the "off" button 22 on the control panel 20.

In one embodiment, when the port button 66 is selected on the control panel, the set of port side transducers 40P wirelessly transmits the set of position information which includes real-time distance and velocity measurements of the port side hull of the marine vessel 60 in relation to the external object 70 to the programmable processor control unit 30. Upon receiving the set of position information, the programmable processor control unit 30 engages the bow thruster 51 and stern thruster 52 in response to real-time distance transducers distance and velocity information provided by the set of port side transducers 41P, 42P, 44P and 45P during docking operations.

Furthermore, the lateral starboard side position transducer 43S and the lateral port side position transducer 43P are located approximately midship on the starboard side and port side respectively, to sense a precise lateral reference point on the external object 70. Each lateral position transducer 43P and 43S is able to sense, detect and wirelessly transmit real time lateral reference point information to the programmable processor control unit 30, which is memorized and utilized during any lateral movement of the marine vessel 60 thereafter for orientation of the marine vessel 60. Additionally, the programmable processor control unit 30 automatically compensates for any fore or aft lateral movement of the marine vessel 60 by controlling a plurality of actuators 53 which engage a main drive to maintain the marine vessel 60 in a controlled lateral path toward the memorized precise lateral reference point on the external object 70.

In yet another embodiment, the programmable processor control unit 30 is in electronic communication with and automatically controls the bow thruster 51 and the stern thruster 52 to position the side of the marine vessel 60 adjacent to the external object 70 at a pre-selected distance from the external object 70 and to maintain the side of the marine vessel 60 at the pre-selected distance automatically, thereby providing a completely programmable automatic docking system 10 of integrated interactive proximity obtaining feedback and automatic control of marine vessel positioning which requires no operator after setting the system in operation.

Figure 2:
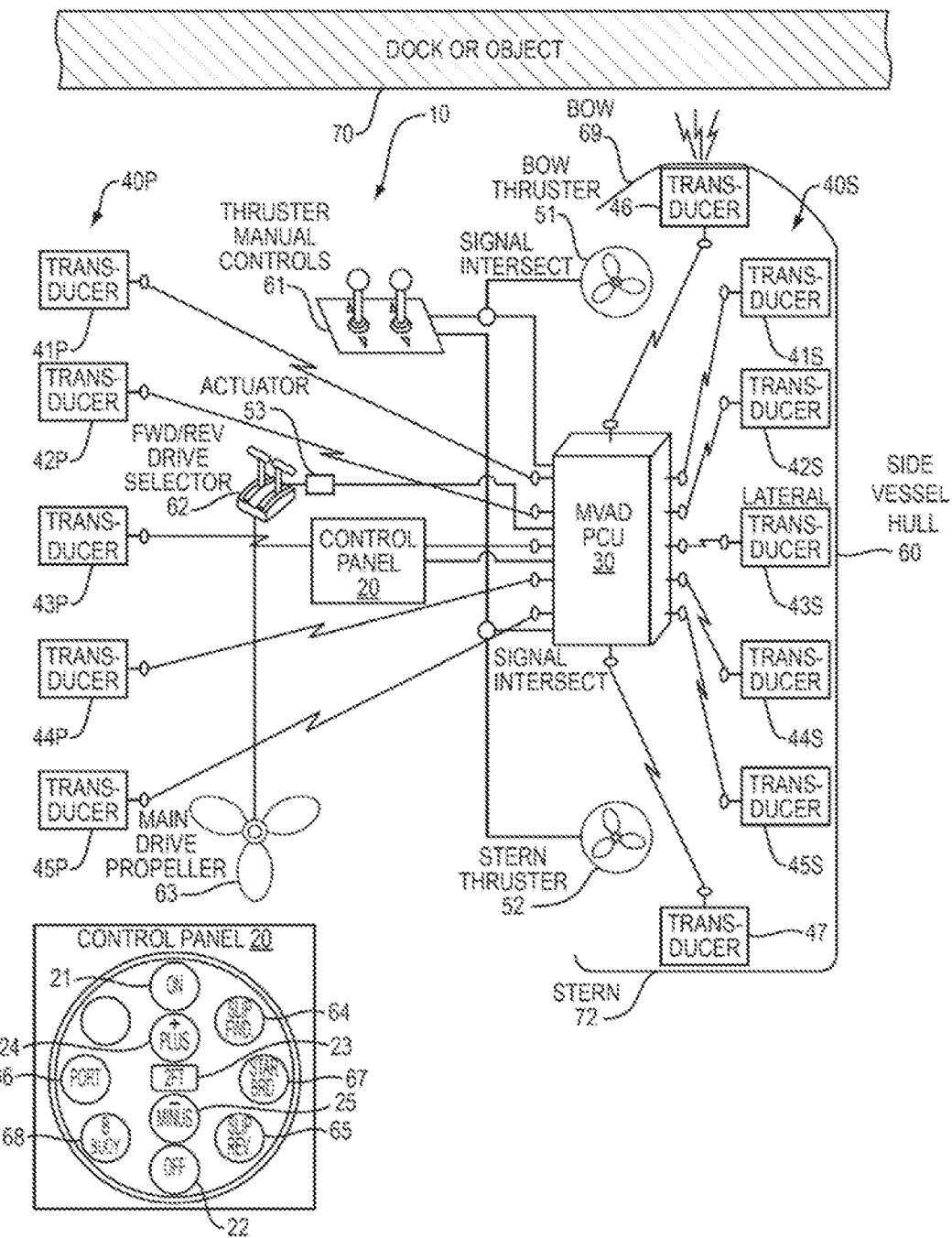
FIG. 2 is a diagrammatic perspective view of one embodiment of the programmable automatic docking system in use during collision avoidance operations.

FIG. 2 illustrates an automatic collision avoidance function of the instant invention preferably in marinas and other similar docking areas. In this embodiment, when a forward/reverse drive selector 62 is in operation, the "ON" button 21 is selected on the control panel 20, and the selection is electronically communicated to the programmable processor control unit 30. Following the activation of the programmable automatic docking system 10, by the selection of the on button 21, the programmable processor control unit 30 transmits to activate a bow distance, velocity and position transducer 46. Upon activation of the bow distance, velocity and position transducer 46, real-time distance and velocity information is detected and wirelessly transmitting to the programmable processor control unit 30 distance and velocity information of the bow 69 of the marine vessel 60 in relation to an external object 70 (i.e., an environment such as a marina, another marine vessel or rocks etc.). In this embodiment, the programmable processor control unit 30 is in electronic communication with a plurality of actuators 53 which control the forward/reverse drive selector 62 to maintain the marine vessel's 60 velocity preferably at a maximum of five knots. Alternatively, if the external object 70 is detected by the bow distance transducer 46 directly ahead of the marine vessel 60 at a distance of one hundred feet or less, the distance and velocity information is transmitted to the processor control unit 30. Subsequently, the programmable processor control unit 30 which is in electronic communication with a plurality of actuators 53 will automatically control the plurality of actuators 53 to engage the main drive to reduce the velocity by 0.06 knots per foot of travel and stop the marine vessel 60 at a default distance of preferably twenty feet away from the external object 70 thereby automatically avoiding a collision. The programmable automatic docking system 10 will maintain this final position in relation to the external object 70 until an operator assumes manual control 61 of the marine vessel 60.

Figure 3:
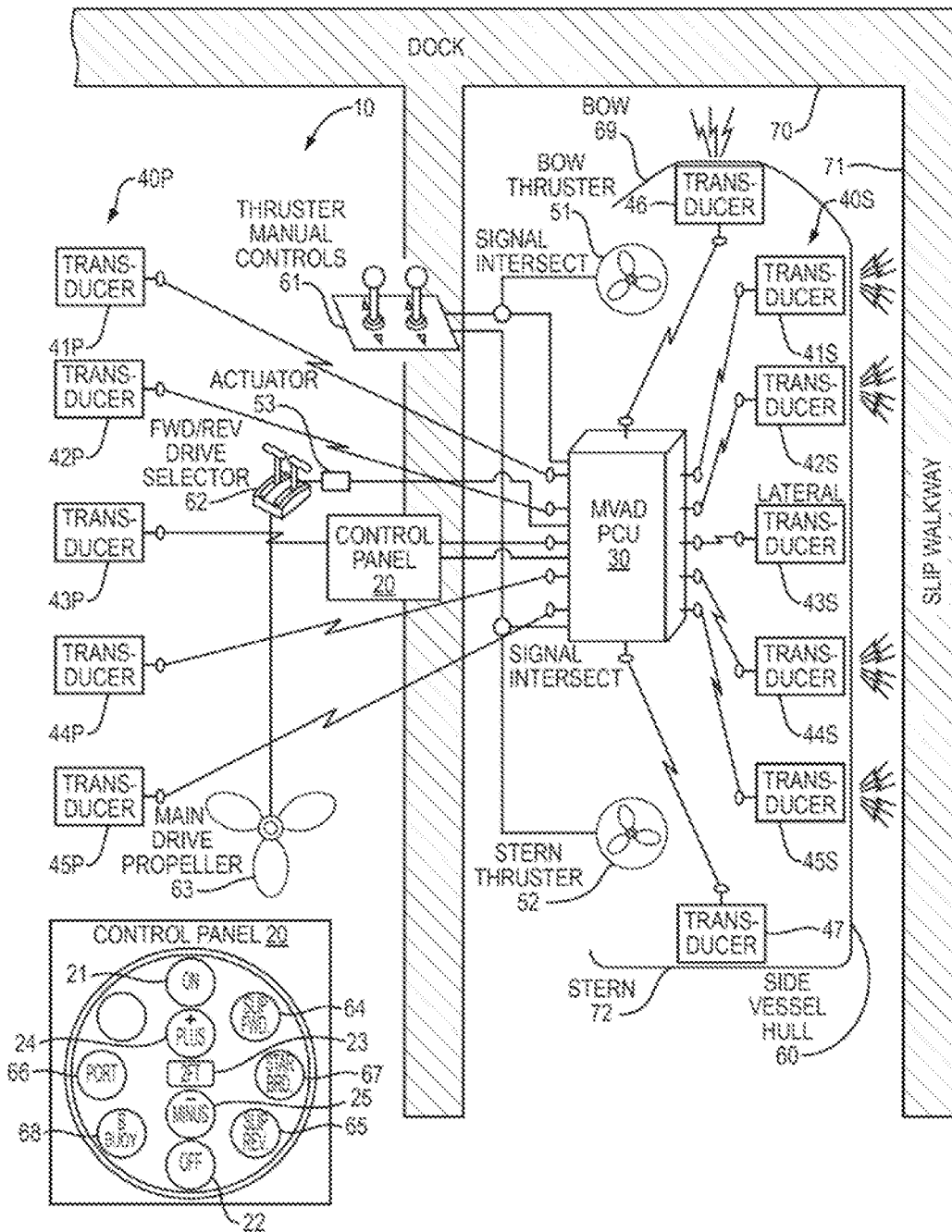
FIG. 3 is a diagrammatic perspective view of one embodiment of the programmable automatic docking system in use during docking operations into a slip.

FIG. 3 illustrates an automatic slip operation of the programmable automatic docking system 10. In this embodiment, a slip location for a marine vessel 60 may be described as follows: a dock is a secured flat structural mass bordering water which has no movement and is above the waterline. A slip walkway is attached to the dock at approximately ninety degrees to the dock extending out above the water at a distance necessary to accommodate marine vessels 60 of various lengths. There are usually two walkways 71 attached to the dock one adjacent to each side of the marine vessel 60 and this structure provides a safe u-shaped location for a marine vessel to be stored, normally with the aid of ropes.

The slip feature of the instant invention is able to operate in both the forward or reverse direction, along with port side or starboard side. When operating in slip reverse direction, a stern distance, velocity and position transducer 47 is engaged. In this embodiment, the control panel 20 further includes a slip forward button 64 and a slip reverse button 65, wherein upon selection of either the slip forward button 64 or slip reverse button 65, the programmable processor control unit 30 maintains the marine vessel's 60 velocity at approximately two knots and defaults to a two feet side clearance between the side of the marine vessel 60 and the slip walkway 71 on the port or starboard side.

In one embodiment, the slip operation of the instant invention may occur as follows (the following example demonstrates a forward starboard selection as shown in FIG. 3):

1. As a marine vessel's bow 69 enters the slip, an operator selects the slip forward button 64 on the control panel 20.
2. Thereafter, the starboard button 67 is selected on the control panel 20.

Following the selection of the slip forward button 64 and the selection of the starboard button 67 by the operator, all further operations are maintained and controlled by the programmable automatic docking system 10, thereby eliminating further operator intervention.

In one embodiment (assuming for example that the starboard button 67 has been selected on the control panel 20), as the marine vessels bow 69 enters the slip, the set of starboard side transducers, namely the pair of distance sensing transducers 41S and 42S located on the starboard fore side of the marine vessel 60, and the pair of distance sensing transducers 44S and 45S located on the starboard aft side of the marine vessel 60 transmit a set of distance and velocity information to the programmable processor control unit 30; the set of distance and velocity information preferably relates to the distance between the starboard side of the marine vessel 60 and the slip walkway 71. The programmable processor control unit 30 will maintain the starboard side of the marine vessel 60 at a default distance setting of approximately two feet between the marine vessel 60 and the slip walkway 71 by engaging the bow thruster 51 and the stern thruster 52 via electronic communication in response to the distance and velocity information detected and transmitted from the set of starboard side transducers 41S, 42S, 44S and 45S.

Simultaneously and operating independently, while the distance and velocity information is transmitted by the set of starboard side transducers 41S, 42S, 44S and 45S, the bow distance transducer 46 wirelessly transmits distance and velocity information to the programmable processor control unit 30 in relation to the bow 69 and the dock 70. Furthermore, the programmable processor control unit 30 is in electronic communication with and controls a plurality of actuators 53, which in turn control the forward/reverse drive selector 62. Therefore, the marine vessel 60 will automatically proceed to the dock 70 and maintain a maximum velocity of two knots until the bow distance transducer 46 transmits a minimum distance of three feet between the dock 70 and the bow 69 of the marine vessel 60 to the programmable processor control unit 30. Once the bow 69 of the marine vessel is three feet from the dock 70, the programmable processor control unit 30 will engage the plurality of actuators 53 controlling the forward/reverse drive selector 62 to stop the marine vessel 60 three feet from the dock 70 and maintain this final position indefinitely while the programmable automatic docking system 10 is in operation.

Figure 4:
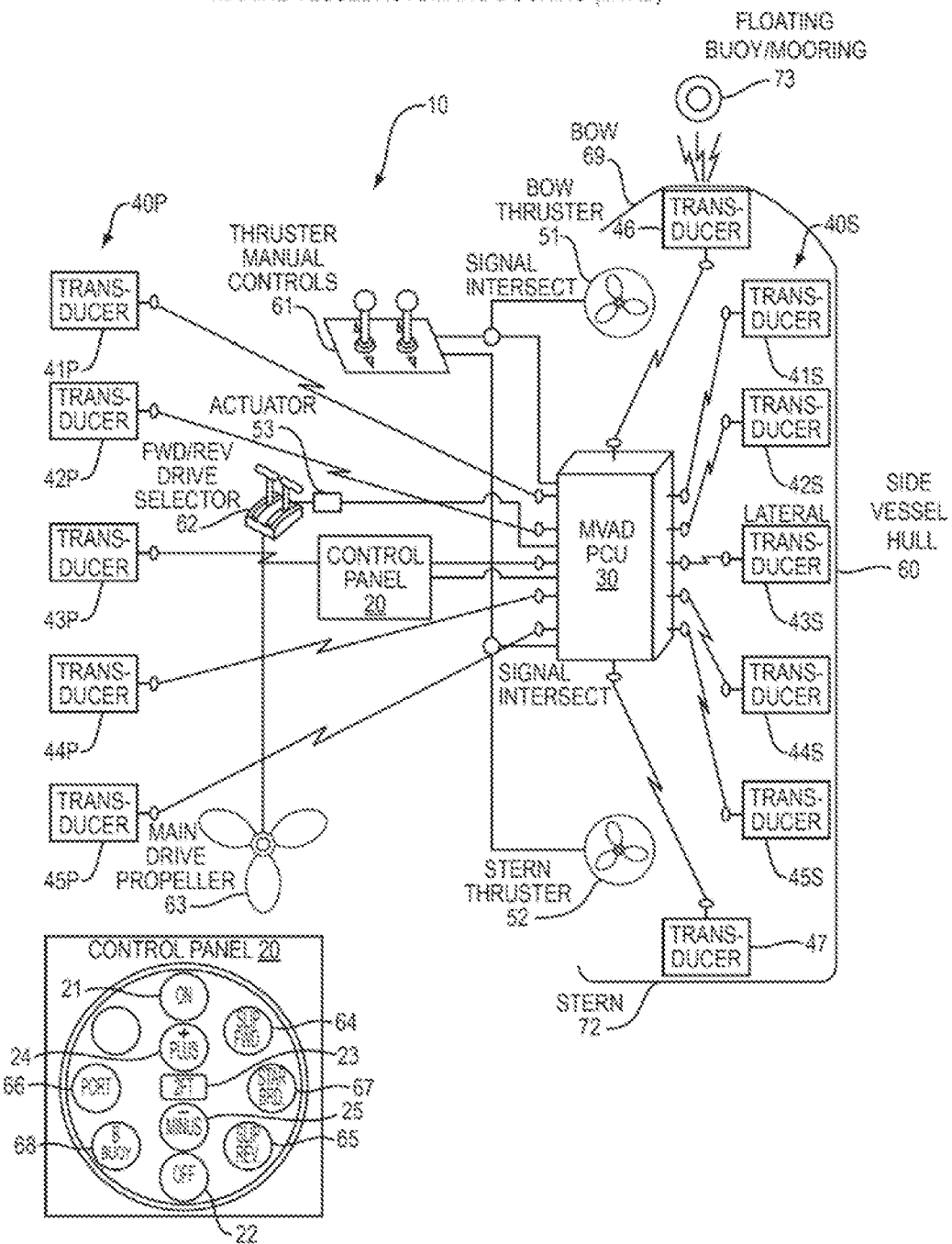
FIG. 4 is a diagrammatic perspective view of one embodiment of the programmable automatic docking system in use displaying automatic location of a floating buoy and/or mooring.

FIG. 4 illustrates a floating buoy/mooring operation of the instant invention, wherein the buoy/mooring operation includes the use of at least one bow distance, velocity and position transducer 46 for sensing the location, velocity and distance of a floating buoy/mooring 73.

In one embodiment, the floating buoy/mooring operation may occur as follows:

The bow 69 of the marine vessel 60 is brought into approximate alignment with the buoy/mooring 73 up to two hundred feet or less ahead of the bow 69 of the marine vessel 60. Upon approximate achievement of this position, a buoy button 68 is selected on control panel 20. Once the buoy button 68 is selected, the programmable processor control unit 30 wirelessly transmits to activate the bow distance, velocity and position transducer 46. Upon activation of the bow distance transducer 46, the bow distance transducer 46 detects and transmits a set of distance, position and velocity information to the programmable processor control unit 30; the set of position information includes the distance and location of the bow 69 of the marine vessel 60 with respect to the position of the buoy/mooring 73, along with the current velocity of the marine vessel 60. Additionally, the programmable processor control unit 30 remains in electronic communication and automatically engages a plurality of actuators 53 which control the forward/reverse drive selector 62; the programmable processor control unit 30 maintains a maximum speed of the marine vessel 60 of approximately two knots and controls the bow thruster 51 via electronic communication in response to bow distance, velocity and position transducer real time information to maintain the direction of the bow 69 of the marine vessel 60 toward the buoy/mooring 73. Once the bow distance, velocity and position transducer 46 transmits a distance of three feet between the bow 69 of the marine vessel 60 and the buoy/mooring 73, the programmable processor control unit 30 activates the plurality of actuators 53. This in turn, controls the forward/reverse drive selector 62 to stop the marine vessel 60 and continue to control the forward/reverse drive selector 62 and bow thruster 51 to maintain the bow 69 approximately three feet from the buoy/mooring 73 indefinitely until the "OFF" switch 22 is selected on the control panel 20.

Figure 5A:
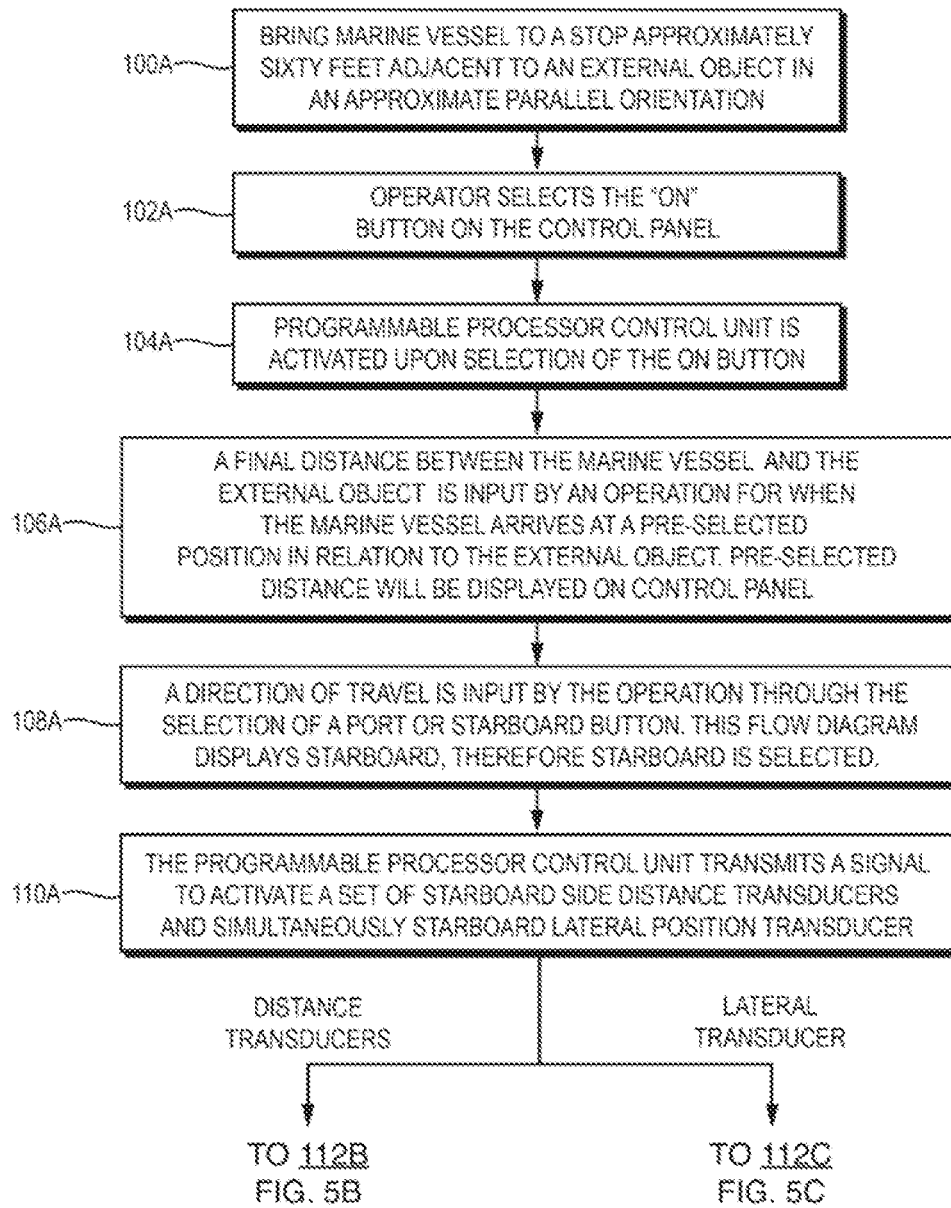
FIGS. 5A-5C is a set of flow diagrams illustrating one embodiment of the method of operation of the programmable automatic docking system during docking operations of a marine vessel with an external object.
Figure 5B:
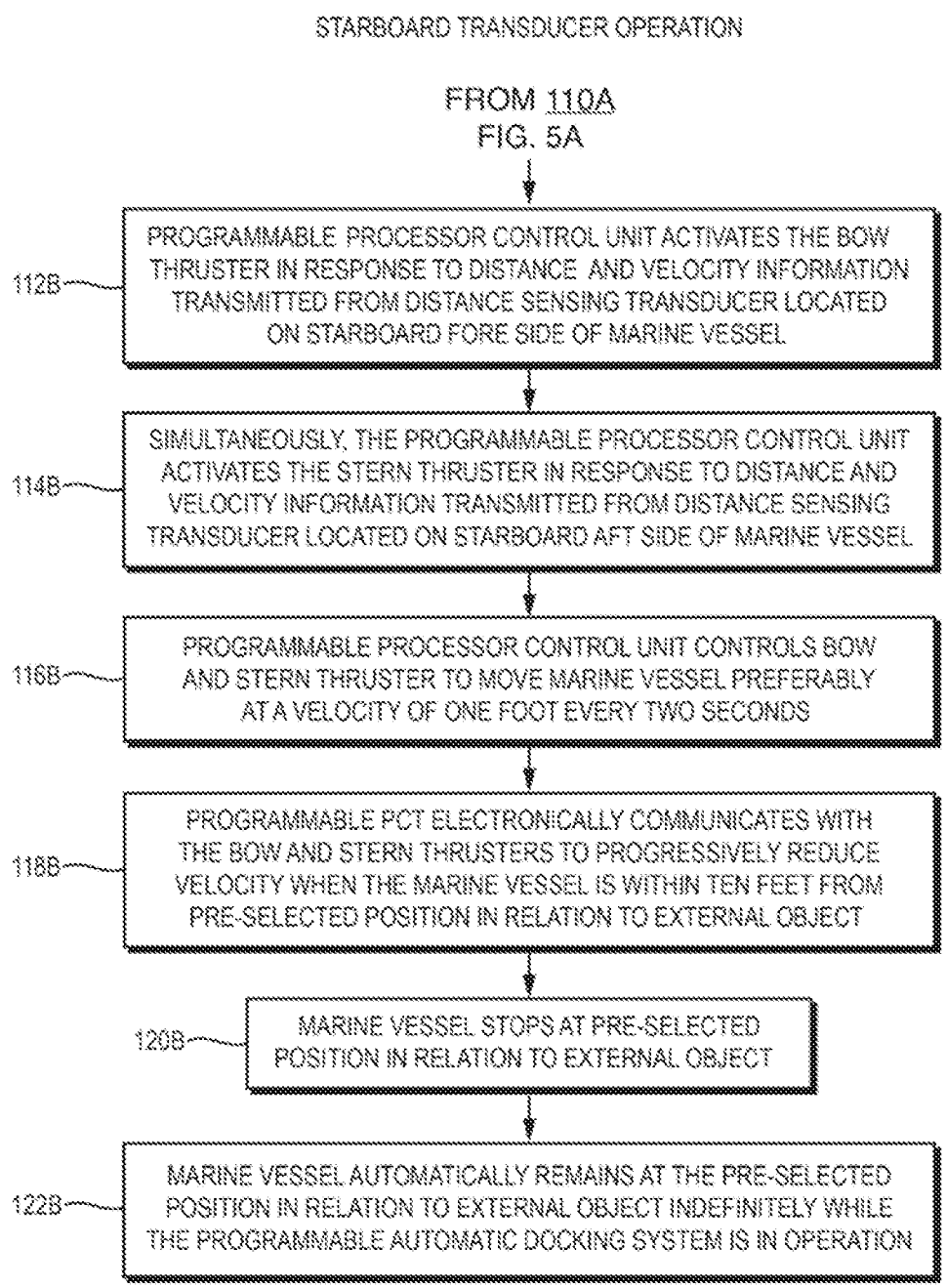
Figure 5C:
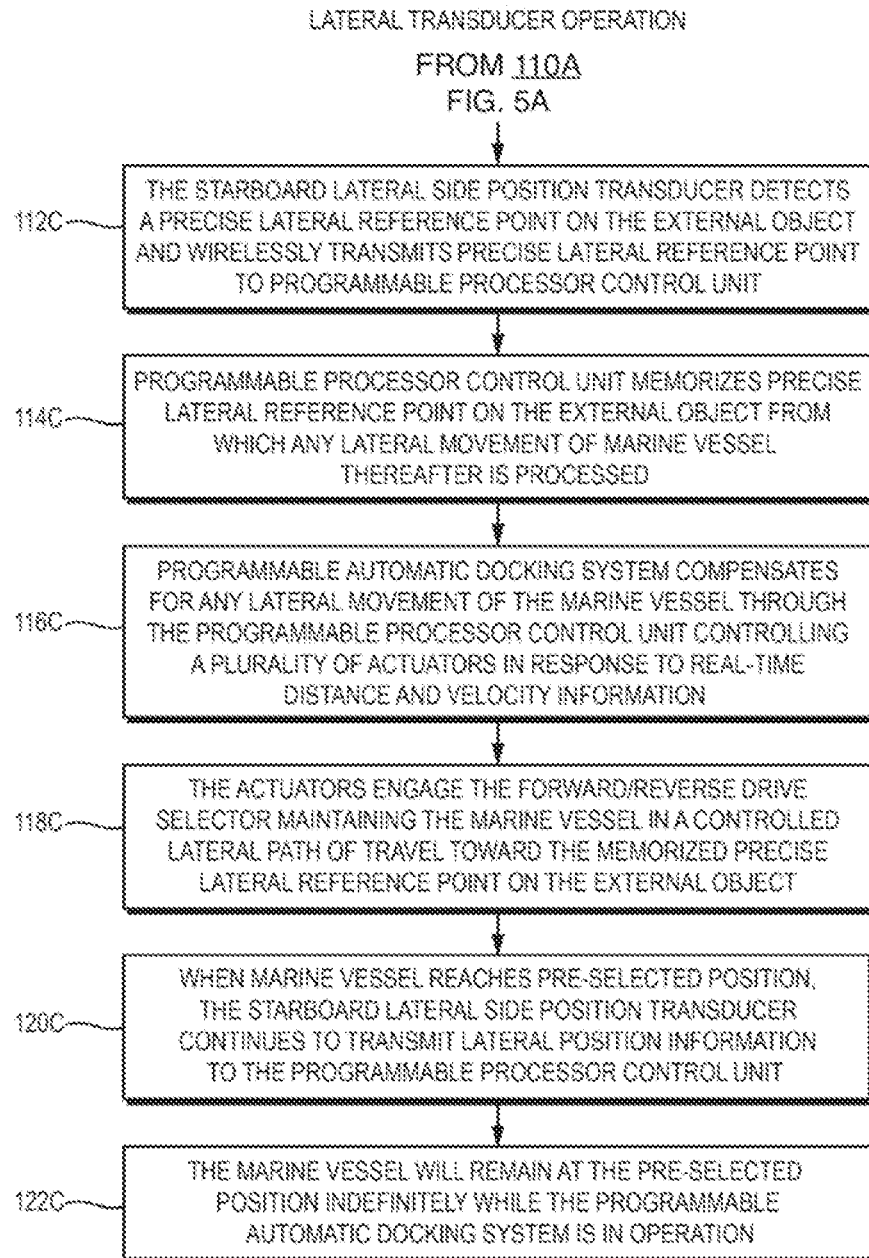

FIGS. 5A-5C illustrates one embodiment of the method of operation of the programmable automatic docking system 10 during docking operations. In this example, the marine vessel will be docking at a starboard external object 70, merely for illustration purposes as shown in FIG. 1.

Initially at step 100A, an operator will bring the marine vessel 60 to a stop approximately sixty feet or less adjacent to the external object 70, wherein the marine vessel 60 preferably is in a parallel orientation to the external object 70. Once the marine vessel 60 is stopped, then at step 102A, the on button 21 located on the control panel 20 is selected by an operator. Upon selection of the on button 21, at step 104A, the programmable processor control unit 30 is activated. Following activation of the programmable processor control unit 30, at step 106A a final desired distance between the starboard side of the marine vessel 60 and the external object 70 is pre-selected in order for the programmable automatic docking system 10 to cease movement of the marine vessel once the pre-selected position is reached. In one embodiment, the pre-selected distance may be input into the control panel 20 by pressing a plus button 24 to increase the distance or by pressing a minus button 25 to decrease the distance; the present distance selected will be shown on a display 23. Once the final distance is selected, at step 108A, a port button 66 or a starboard button 67 is selected on the control panel 20 (for this example a starboard button 67 will be selected). At step 110A, the programmable processor control unit 30 automatically transmits to activate a set of starboard side transducers 40S, which include the pair of distance sensing transducers 41S and 42S located on the starboard fore side of the marine vessel 60, and the pair of distance sensing transducers 44S and 45S located on the starboard aft side of the marine vessel 60 and a starboard side lateral position transducer 43S. Following activation of the set of starboard side transducers 40S, at step 112B the programmable processor control unit 30 activates the bow thruster 51 via electronic communication in response to the set of real-time distance and velocity information transmitted from the pair of distance sensing transducers 41S and 42S located on the starboard fore side of the marine vessel 60 to move the marine vessel 60 in a starboard direction. Simultaneously, at step 114B the programmable processor control unit 30 activates the stern thruster 52 via electronic communication in response to the set of real-time distance and velocity information transmitted from the pair of distance sensing transducers 44S and 45S located on the starboard aft side of the marine vessel 60 to move the marine vessel 60 in a starboard direction. At step 116B, the programmable processor control unit 30 automatically controls the bow thruster 51 and the stern thruster 52 to move the marine vessel 60 in a starboard direction preferably at a velocity of one foot every two seconds towards the external object 70. Once the marine vessel 60 is approximately within ten feet from the pre-selected final distance in relation to the external object 70, at step 118B the programmable processor control unit 30 communicates with the bow thruster 51 and the stern thruster 52 to reduce the velocity of the marine vessel 60; for example, if the pre-selected final distance from the external object 70 is five feet, then the marine vessel 60 will begin reducing velocity by 0.03 knots per foot of travel at fifteen feet from the external object 70. Next, at step 120B, once the pre-selected final position is reached, the programmable processor control unit 30 engages the bow thruster 51 and the stern thruster 52 to stop the marine vessel 60. Once the pre-selected final distance to the external object 70 is reached by the marine vessel 60, at step 122B, the final pre-selected position is maintained indefinitely while the programmable automatic docking system 10 is in operation.

While the starboard transducers 41S, 42S, 44S and 45S are in operation and transmitting real-time distance and velocity information to the programmable processor control unit 30 to move the marine vessel 60 in a starboard direction, the starboard lateral side position transducer 43S will be operating simultaneously and independent of the set of starboard transducers 41S, 42S, 44S and 45S to detect and transmit real-time lateral position of the marine vessel 60.

Therefore, at step 112C, the starboard lateral side position transducer 43S detects a lateral reference point on the external object 70 and wirelessly transmits the lateral reference point to the programmable processor control unit 30. At step 114C, the programmable processor control unit 30 memorizes the lateral reference point, from which any future lateral movement of the marine vessel 60 thereafter is processed. At step 116C, the programmable processor control unit 30 automatically compensates for any lateral movement of the marine vessel 60 by controlling the plurality of actuators 53 in response to the real-time lateral position information transmitted from the starboard lateral side position transducer 43S. At step 118C, the plurality of actuators 53 engage the forward/reverse drive selector 62 in order to maintain the marine vessel 60 in a controlled lateral path of travel toward the precise lateral reference point memorized by the programmable processor control unit 30. At step 120C once the marine vessel 60 reaches the final preselected position as described at step 118C, the starboard lateral side position transducer 43S will continue to transmit real-time lateral position information of the marine vessel 60 in relation to the memorized precise lateral reference point to the programmable processor control unit 30 and at step 122c will maintain the lateral position of the marine vessel 60 while the programmable automatic docking system 10 is in operation.

Figure 6:
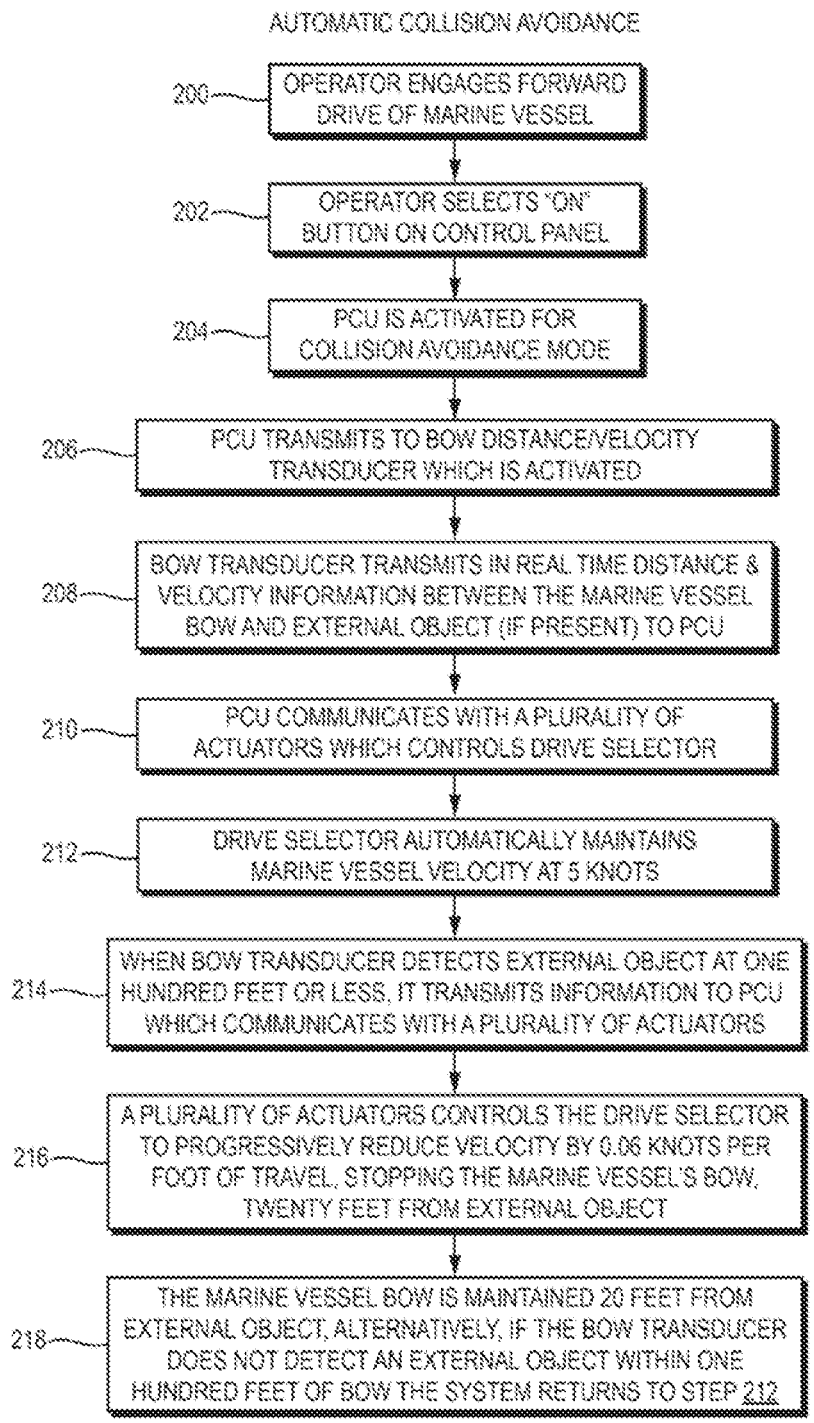
FIG. 6 is a flow diagram illustrating one embodiment of the method of operation of the programmable automatic docking system during collision avoidance operations of a marine vessel with an external object.

FIG. 6 illustrates one embodiment of the method of operation of the programmable automatic docking system during collision avoidance operations of a marine vessel with an external object. Initially, at step 200, the forward/reverse drive selector 62 is engaged by an operator of the marine vessel 60. At step 202, the on button 21 of the control panel 20 is selected by the operator of the marine vessel 60. Following selection of the on button 21, at step 204, the programmable processor control unit 30 of the programmable automatic docking system 10 is activated. At step 206, the programmable processor control unit 30 transmits to activate the bow distance, velocity and position transducer 46. At step 208, once the bow distance, velocity and position transducer 46 is activated, the bow distance, velocity and position transducer 46 will detect and transmit real time distance and velocity information between the bow 69 of the marine vessel 60 and an external object 70. After transmission of the initial distance information, at step 210 the forward/reverse drive selector 62 is controlled via a plurality of actuators 53 in electronic communication with the programmable processor control unit 30. At step 212 the programmable processor control unit 30 controls the forward/reverse drive selector 62 to maintain the marine vessel 60 preferably at a default velocity of five knots. At step 214, the bow distance, velocity and position transducer 46 continues to transmit real-time distance information and when an external object 70 is detected one hundred feet or less from the bow 69 of the marine vessel 60 the programmable processor control unit 30 communicates electronically with the plurality of actuators 53. At step 216, the plurality of actuators 53 control the forward/reverse drive selector 62 reducing velocity by 0.06 knots per foot of travel to stop the marine vessel 60 twenty feet from the external object 70. Finally, at step 218, once a distance of twenty feet between the bow 69 of the marine vessel 60 and the external object 70 is reached, the marine vessel 60 is maintained at that position indefinitely. Alternatively, if the bow distance, velocity and position transducer 46 does not detect an external object 70 within one hundred feet of the bow 69 of the marine vessel at step 218, then the system returns to step 212 to continue to transmit real-time distance information from the bow distance, velocity and position transducer 46 to the programmable processor control unit 30.

Figure 7A:
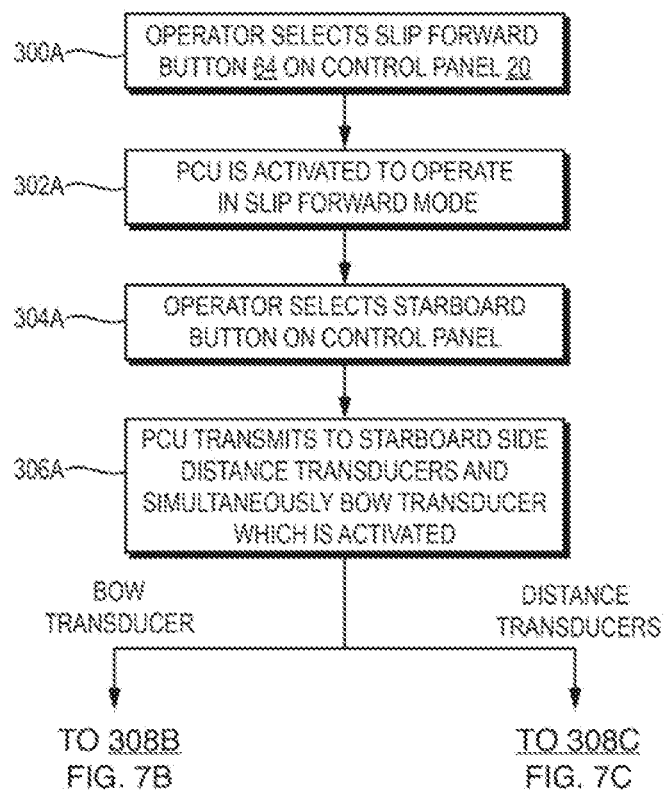
FIGS. 7A-7C is a set of flow diagrams illustrating one embodiment of the method of operation of the programmable automatic docking system during docking operations of a marine vessel upon entering into a slip.
Figure 7B:
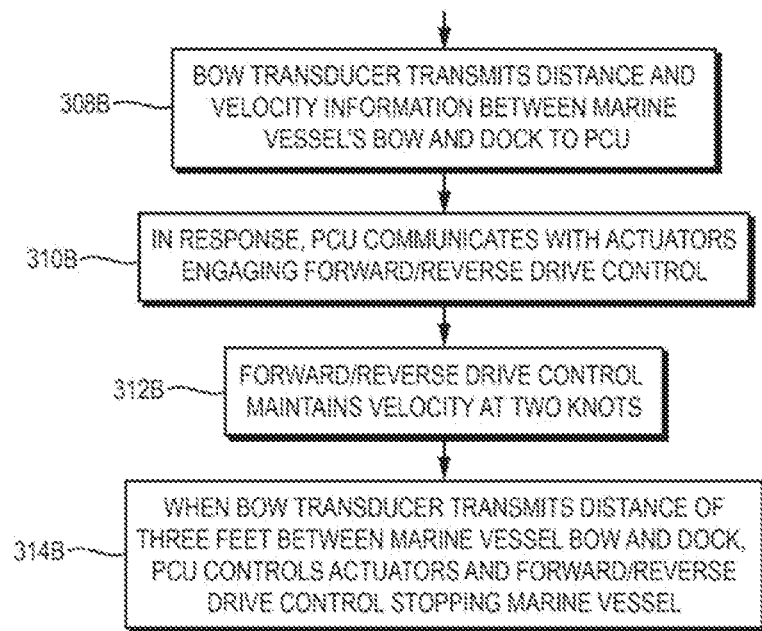
Figure 7C:
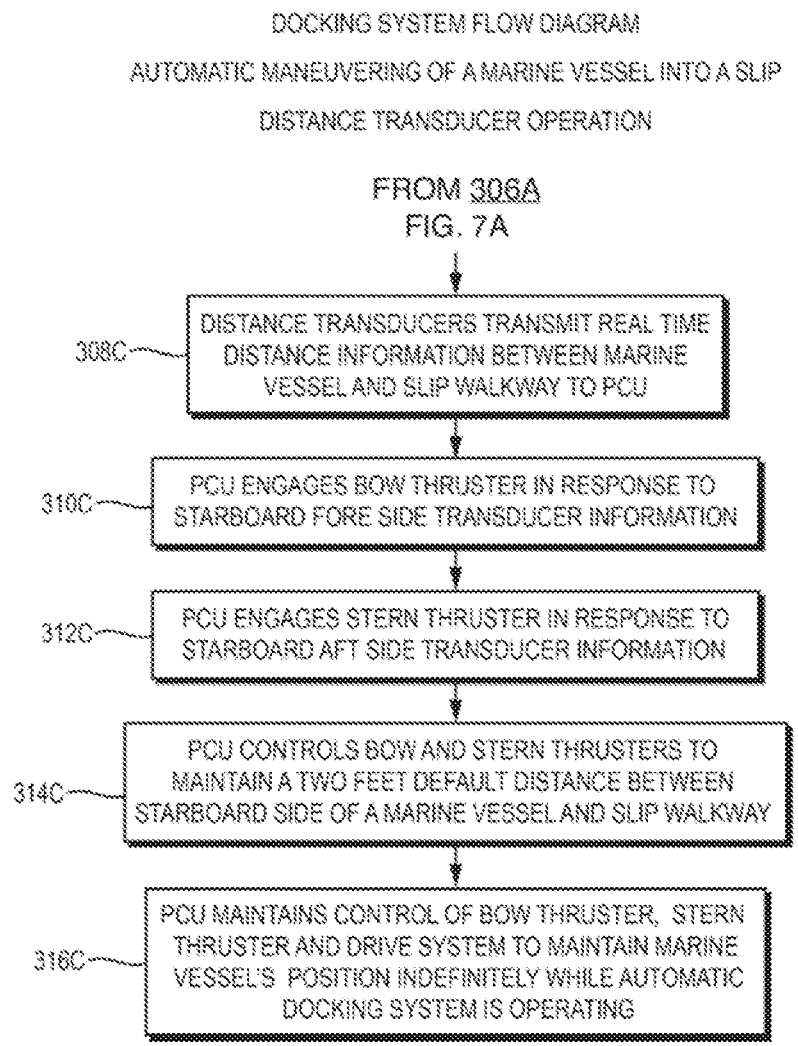

FIGS. 7A-7C illustrate a flow diagram illustrating one embodiment of the method of operation of the programmable automatic docking system during docking operations of a marine vessel upon marine vessels bow entering a slip; this flow diagram demonstrates the forward movement and starboard selection previously shown in FIG. 3.

Initially, at step 300A an operator of the system selects the slip forward button 64 on the control panel 20. At step 302A the programmable processor control unit 30 is activated to operate the slip forward mode. At step 304A the operator selects the port button 66 or the starboard button 67 on the control panel 20 (by way of illustration, starboard button 67 is selected as follows). At step 306A, the programmable processor control unit 30 automatically transmits to starboard transducers 41S, 42S, 44S, 45S and bow distance, velocity and position transducer 46 which are simultaneously activated. At step 308B the bow distance, velocity and position transducer 46 transmits in real time distance and velocity information between the marine vessels bow 69 and the dock 70 to the programmable processor control unit 30. At step 310B, in response to real time distance and velocity information received from bow distance, velocity and position transducer 46, the programmable processor control unit 30 communicates with actuators 53 which control the forward/reverse drive selector 62. At step 312B, the programmable processor control unit 30 communicates with actuators controlling forward/reverse drive selector 62 which maintains marine vessel 60 velocity at a programmable processor control unit 30 default setting of two knots. At step 314B when bow distance, velocity and position transducer 46 transmits a distance of three feet between marine vessels bow 69 and dock 70 the programmable processor control unit 30 controls actuators 53 and forward/reverse drive selector 62 to stop marine vessel 60 at a default setting of three feet from dock 70. At step 308C starboard distance transducers 41S, 42S, 44S and 45S transmit real time distance information between marine vessel 60 and slip walkway 71 to the programmable processor control unit 30. At step 310C the programmable processor control unit 30 engages bow thruster 51 in response to fore side transducers 41S and 42S distance information and at step 312C simultaneously engages stern thruster 52 in response to distance sensing transducers 44S and 45S distance information to maintain at step 314C a default distance of two feet between marine vessel 60 and slip walkway 71. At step 316C the programmable processor control unit 30 maintains control of bow thruster 51, stern thruster 52, actuators 53 and forward/reverse drive selector 62 to maintain position of marine vessel 60 indefinitely regardless of wind or water currents.

Figure 8:
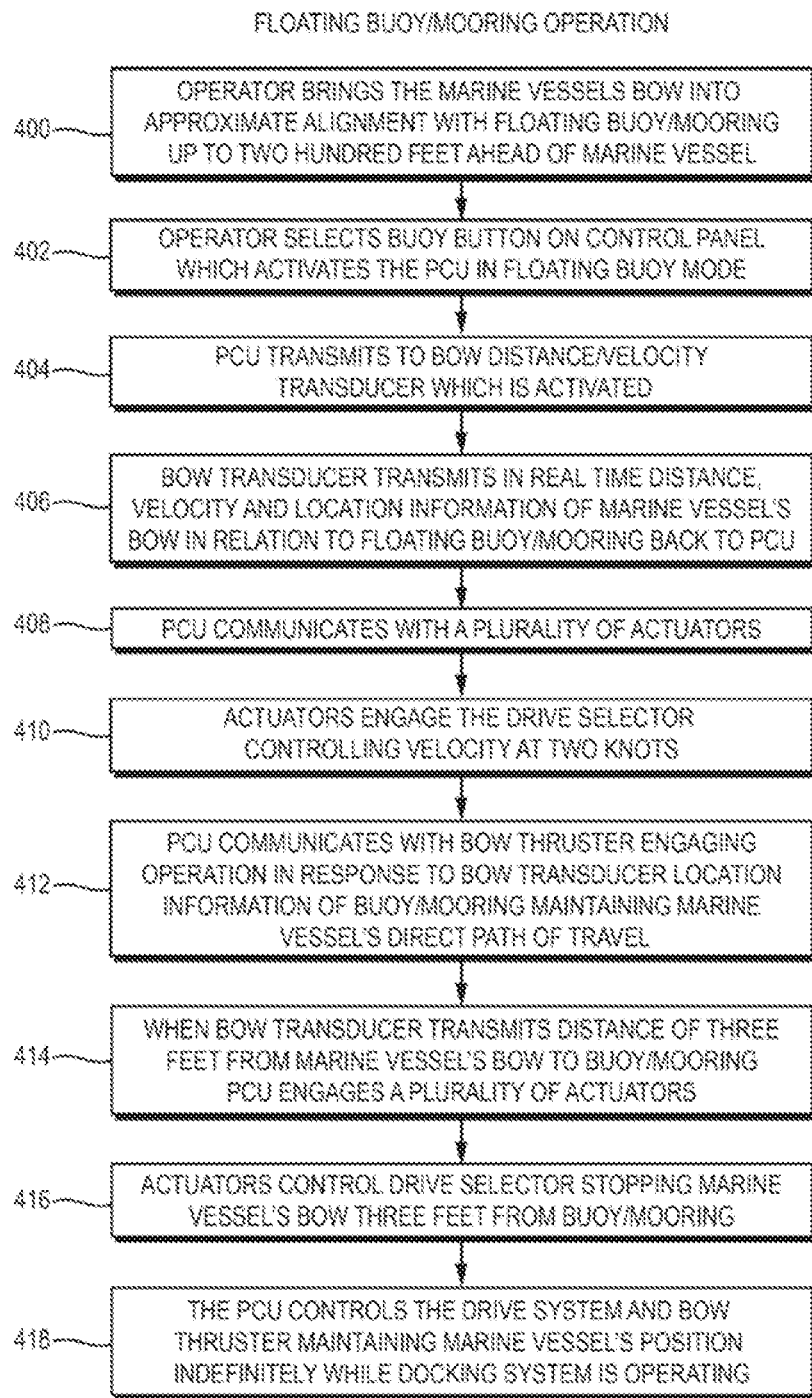
FIG. 8 is a flow diagram illustrating one embodiment of the method of operation of the programmable automatic docking system during the automatic location of a buoy and/or mooring for a marine vessel.

FIG. 8 illustrates a method of operation of the programmable automatic docking system 10 during the automatic location of a buoy and/or mooring for a marine vessel. Initially, at step 400, an operator of the programmable automatic docking system 10 brings the bow 69 of the marine vessel 60 into approximate alignment with a floating buoy/mooring 73 at a distance of approximately two hundred feet or less directly forward of marine vessels bow 69. Once, the marine vessel 60 is in approximate alignment, following at step 402, the operator selects the buoy button 68 on the control panel 20, which in turn activates the programmable processor control unit 30 into buoy mode. At step 404, the programmable processor control unit 30 wirelessly transmits to the bow distance, velocity and position transducer 46 which is then activated. At step 406 following activation, the bow distance, velocity and position transducer 46 detects and transmits real-time distance, location and velocity information to the programmable processor control unit 30 of the bow 69 of the marine vessel in relation to the floating buoy/mooring 73. At step 408, the programmable processor control unit 30 electronically communicates with the plurality of actuators 53 when at step 410 engages the forward/reverse drive selector 62 to maintain the forward velocity of the marine vessel 60 at a default velocity of approximately two knots. Then at step 412, the programmable processor control unit 30 communicates with and engages the bow thruster 51 in response to the real-time distance and position information detected and transmitted by the bow distance, velocity and position transducer 46 to maintain the marine vessel in a direct path of travel towards the floating buoy/mooring 73. At step 414, when the distance between the bow 69 of the marine vessel 60 and the floating buoy/mooring 73 is three feet, the marine vessel 60 is stopped by the programmable processor control unit 30 communicating with and engaging the plurality of actuators 53 which at step 416 control the forward/reverse drive selector 62 to maintain the position of the marine vessel indefinitely. At step 418, as long as the programmable automatic docking system 10 is in operation, the plurality of actuators 53 will control the forward/reverse drive selector 62 and the programmable processor control unit 30 responding to bow distance, velocity and position transducer 46 information will control the bow thruster 51 to maintain the final position of the marine vessel 60.

Figure 9A:
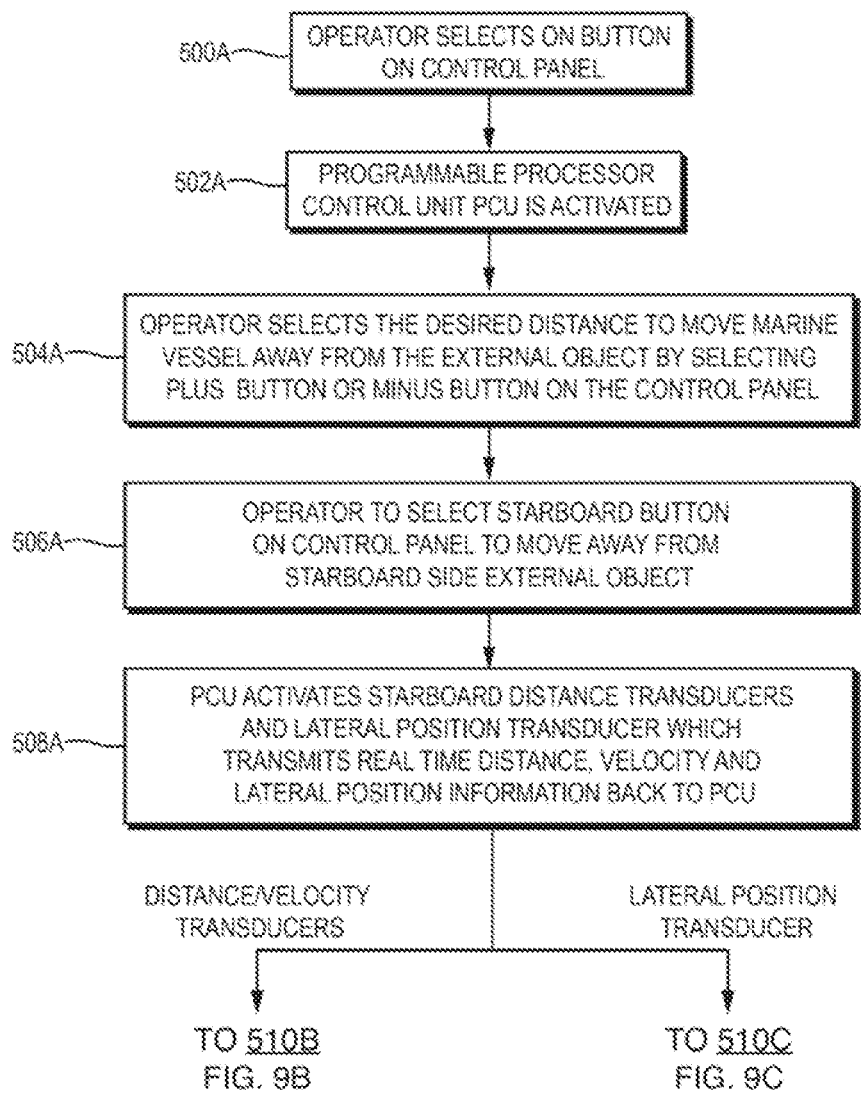
FIGS. 9A-9C is a set of flow diagrams illustrating one embodiment of the method of operation of the programmable automatic docking system during a marine vessel's departure and undocking from an external object.
Figure 9B:
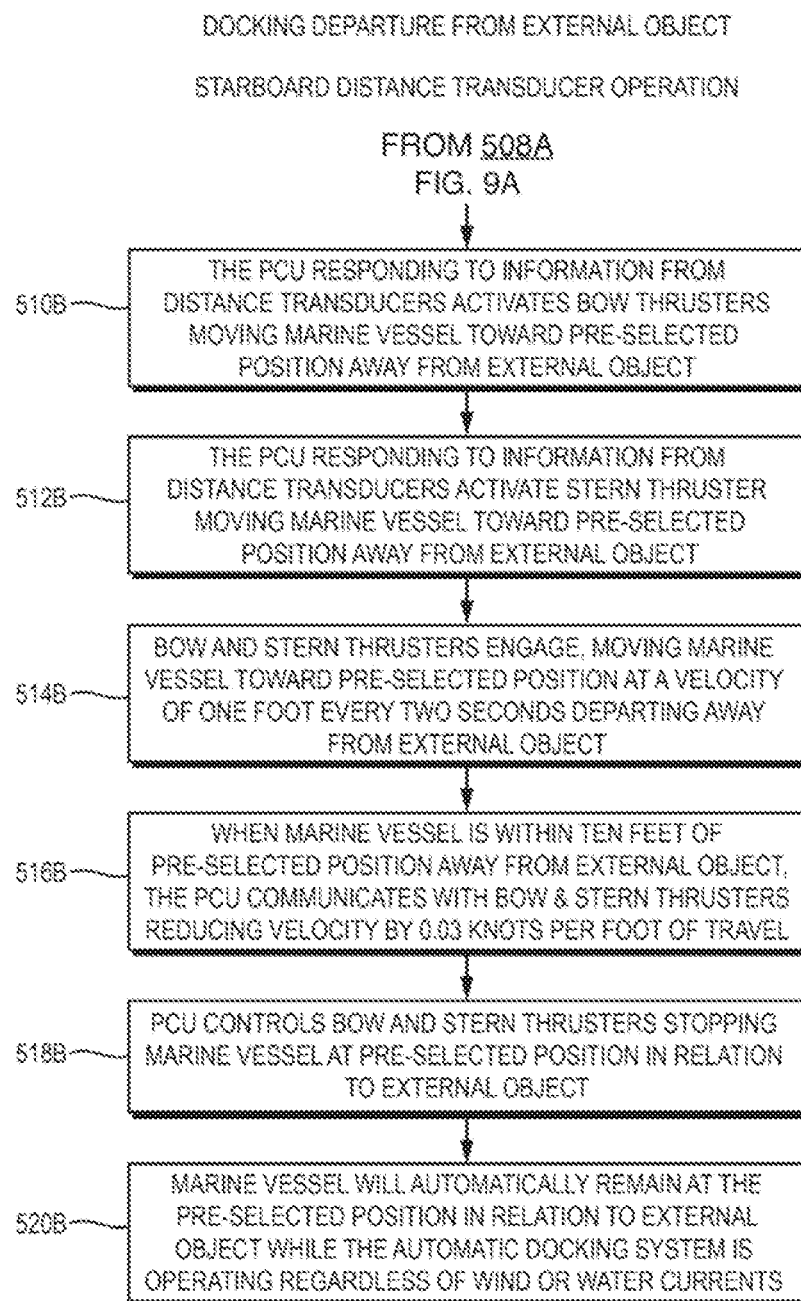
Figure 9C:
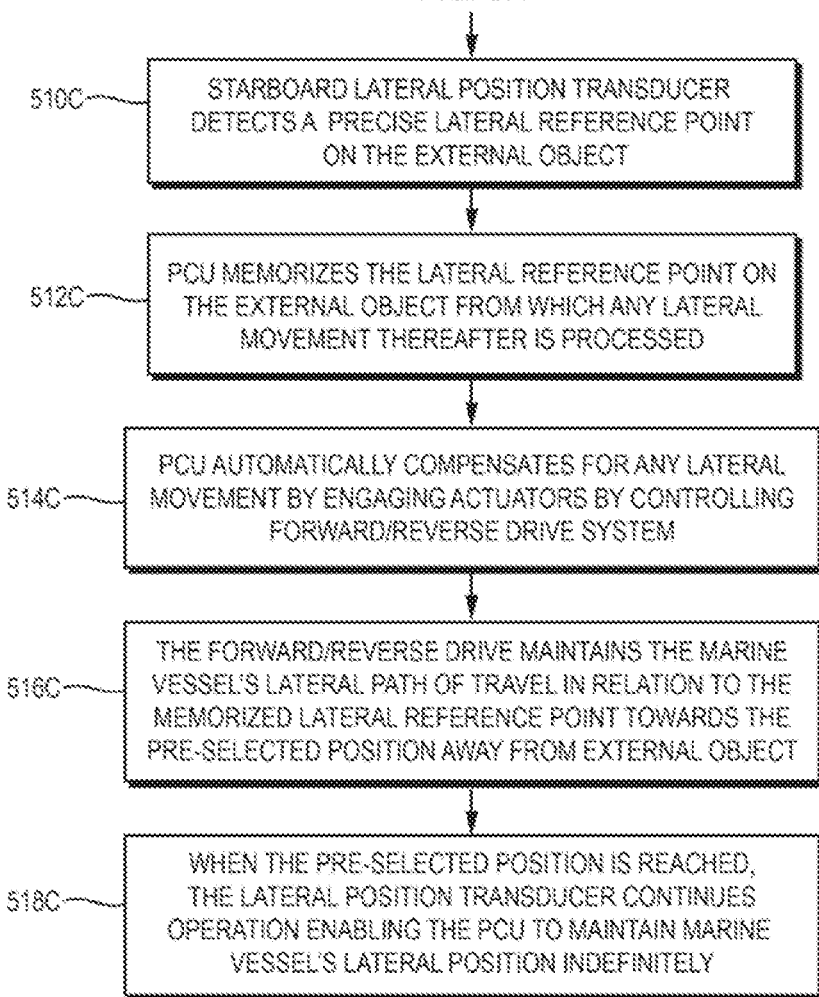

FIGS. 9A-9C illustrate a method of operation of a marine vessel's 60 departure from an external object 70 which is automatically controlled (in this example the marine vessel 60 is departing a starboard side external object 70).

Initially, at step 500A, an operator selects the on button 21 located on the control panel 20, which in turn activates the programmable processor control unit at step 502A. Next, at step 504A, the operator inputs a distance to move the marine vessel 60 away from the external object 70 by selecting a plus button 24 or a minus button 25 on the control panel 20; the selected distance will be shown on the display 23 on the control panel 20, wherein a distance of up to sixty feet may be selected. At step 506A the operator will select the starboard button 67 on the control panel 20 to move the marine vessel 60 away from a starboard side external object 70 (in other embodiments to move away from a port side external object 70, the port button 66 would be selected). At step 508A, the programmable processor control unit 30 activates the set of starboard transducers 40S which includes the starboard lateral side position transducer 43S.

Following activation of the set of starboard side transducers 40S, at step 510B the programmable processor control unit 30 activates the bow thruster 51 via electronic communication in response to the set of real-time distance and velocity information transmitted from the pair of fore side distance sensing transducers 41S and 42S located on the starboard fore side of the marine vessel 60 to move the marine vessel 60 to the pre-selected distance away from the external object. Simultaneously at step 512B the programmable processor control unit 30 activates the stern thruster 52 via electronic communication in response to the pair of real-time distance and velocity information transmitted from the pair of distance sensing transducers 44S and 45S located on the starboard aft side of the marine vessel 60 to move the marine vessel 60 to the pre-selected distance away from the external object 70. The set of starboard side transducers 41S, 42S, 44S and 45S detect and record a set of distance and velocity information between the starboard side of the marine vessel 60 and the external object 70. At step 514B, the programmable processor control unit 30 controls the bow thruster 51 and the stern thruster 52 to move the marine vessel 60 to the pre-selected distance away from the external object preferably at a default velocity of one foot every two seconds. At step 516B, once the marine vessel 60 is approximately within ten feet from the pre-selected distance in relation to the external object 70, the programmable processor control unit 30 communicates with the bow thruster 51 and the stern thruster 52 to reduce the velocity of the marine vessel 60 by 0.03 knots per foot of travel; for example, if the pre-selected distance from the external object 70 is fifty feet, then the marine vessel 60 will reduce velocity at forty feet from the external object 70. Next, at step 518B, once the pre-selected final position is reached, the programmable processor control unit 30 engages the bow thruster 51 and the stern thruster 52 to stop the marine vessel 60. Once the pre-selected distance to the external object 70 is reached by the marine vessel 60, at step 520B, the pre-selected position in relation to the external object 70 is maintained while the programmable automatic docking system 10 is in operation.

While the set of starboard transducers 41S, 42S, 43S and 45S are in operation and transmitting real-time distance and velocity information to the programmable processor control unit 30 to move the marine vessel 60 to the pre-selected distance away from the external object, the starboard lateral side position transducer 43S will be operating simultaneously and independent of the set of starboard transducers 41S, 42S, 44S and 45S to detect and transmit real-time lateral position of the marine vessel 60. Therefore, at step 510C, once the starboard lateral side position transducer 43S is activated, the starboard lateral side position transducer 43S detects a precise lateral reference point on the external object 70, which at step 512C the programmable processor control unit 30 memorizes, and from which any future lateral movement of the marine vessel 60 thereafter is processed. At step 514C, the programmable processor control unit 30 automatically compensates for any lateral movement of the marine vessel 60 by controlling the plurality of actuators 53 in response to the real-time lateral position information transmitted from the starboard lateral side position transducer 43S. At step 516C, the plurality of actuators 53 engage the forward/reverse drive selector 62 in order to maintain the marine vessel 60 in a controlled lateral path of travel in relation to the precise lateral reference point memorized by the programmable processor control unit 30.

Once the pre-selected distance away from the external object 70 is reached by the marine vessel 60, at step 518C, the pre-selected position is maintained while the programmable automatic docking system 10 is in operation.

Although described above in connection with the use of programmable automatic docking systems, the methods and systems described herein may include, instead of or in addition to such systems, other components for providing functionality that, in some embodiments, provides automatic location placement systems.

The technologies described herein include functionality for automated vessel base placement, collision-free path planning, and automated guided manipulation. These technologies are integrated with a marine vessel to provide capabilities for selecting a targeted location, automated vessel approach, and placement.

In one embodiment, an automatic location placement system includes a mapping generated by a central processing unit from data received over an optical feed from vision ranging and infrared vision systems, as well as from high precision inertial measurement units (IMUs) and (GPS) and a central processing unit (CPU), for automatic location placement of, for example, a marine vessel into a targeted location in relation to an external object, including, but not limited to a dock or other external object. In some embodiments, the automatic location placement system may automatically position a marine vessel between two external objects regardless of wind and water currents. The automatic location placement system, once engaged, may operate completely automatically without human operators, by controlling the precise movement and location of a marine vessel in relation to external objects until the marine vessel reaches a final targeted position, and then the automatic location placement system maintains the final position of the marine vessel while the automatic location placement system is in operation regardless of wind and water currents.

In some embodiments, the automatic location placement system may make use of photographic and infrared area mapping of distance and velocity information providing feedback to the central processing unit to enable a plurality of drive systems on the marine vessel, to move the marine vessel in a controlled path of travel and velocity to the final targeted location relative to an external object.

Another feature of certain embodiments of the automatic location placement system disclosed herein is the ability to operate effectively and with precision in darkness and in adverse weather conditions, without the requirement or need for human operators to carry out manual maneuvering to a targeted location in relation to an external object.

Another feature of the automatic location placement system is the ability to maintain a targeted location of a marine vessel once the marine vessel has reached the location that was targeted on a touch screen monitor relative to an external object and to maintain that location indefinitely regardless of the wind and water currents while the location placement system is in operation.

Figure 10A:
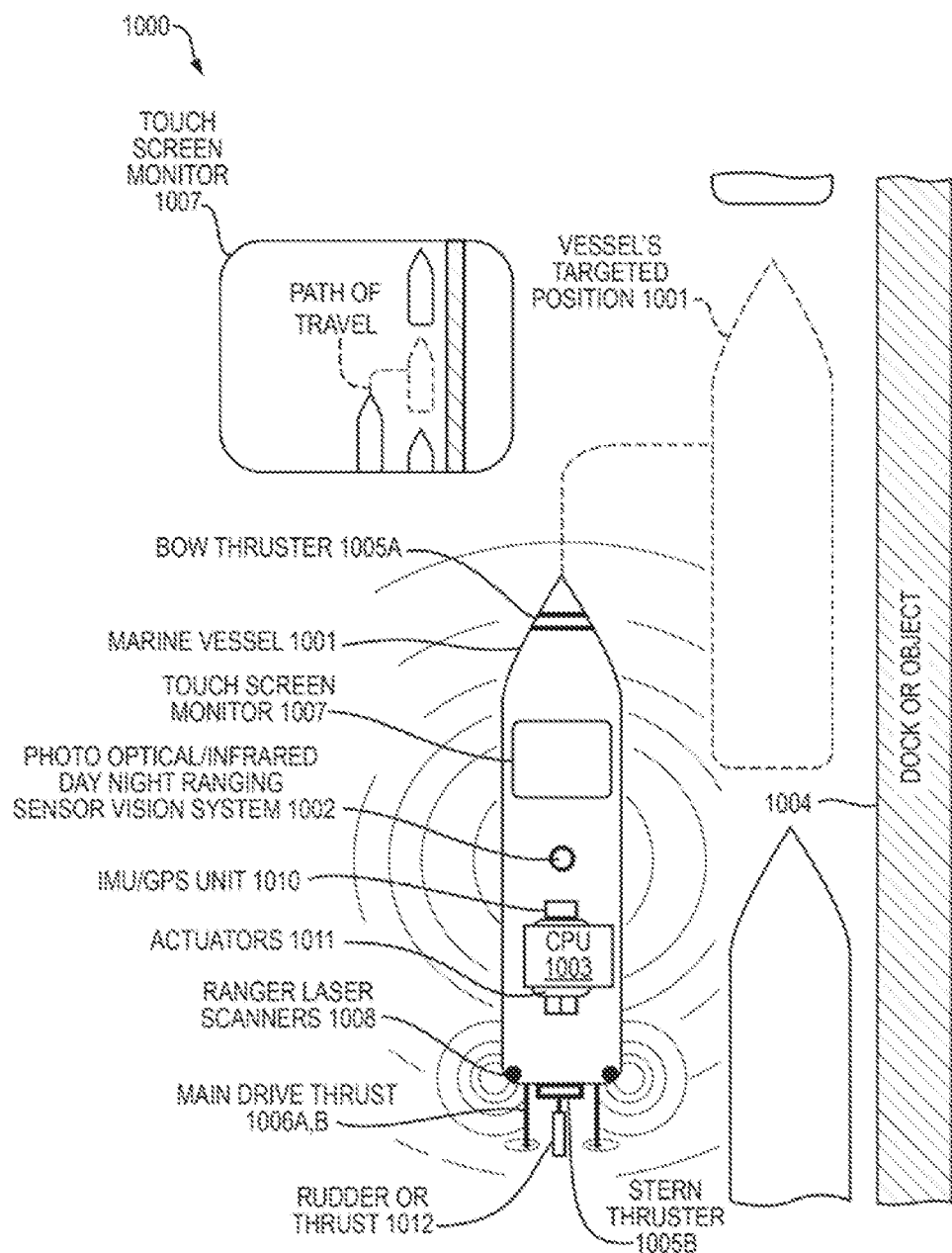
FIG. 10A illustrates a diagrammatic perspective view of an embodiment of an automatic location placement system.
Figure 10B:
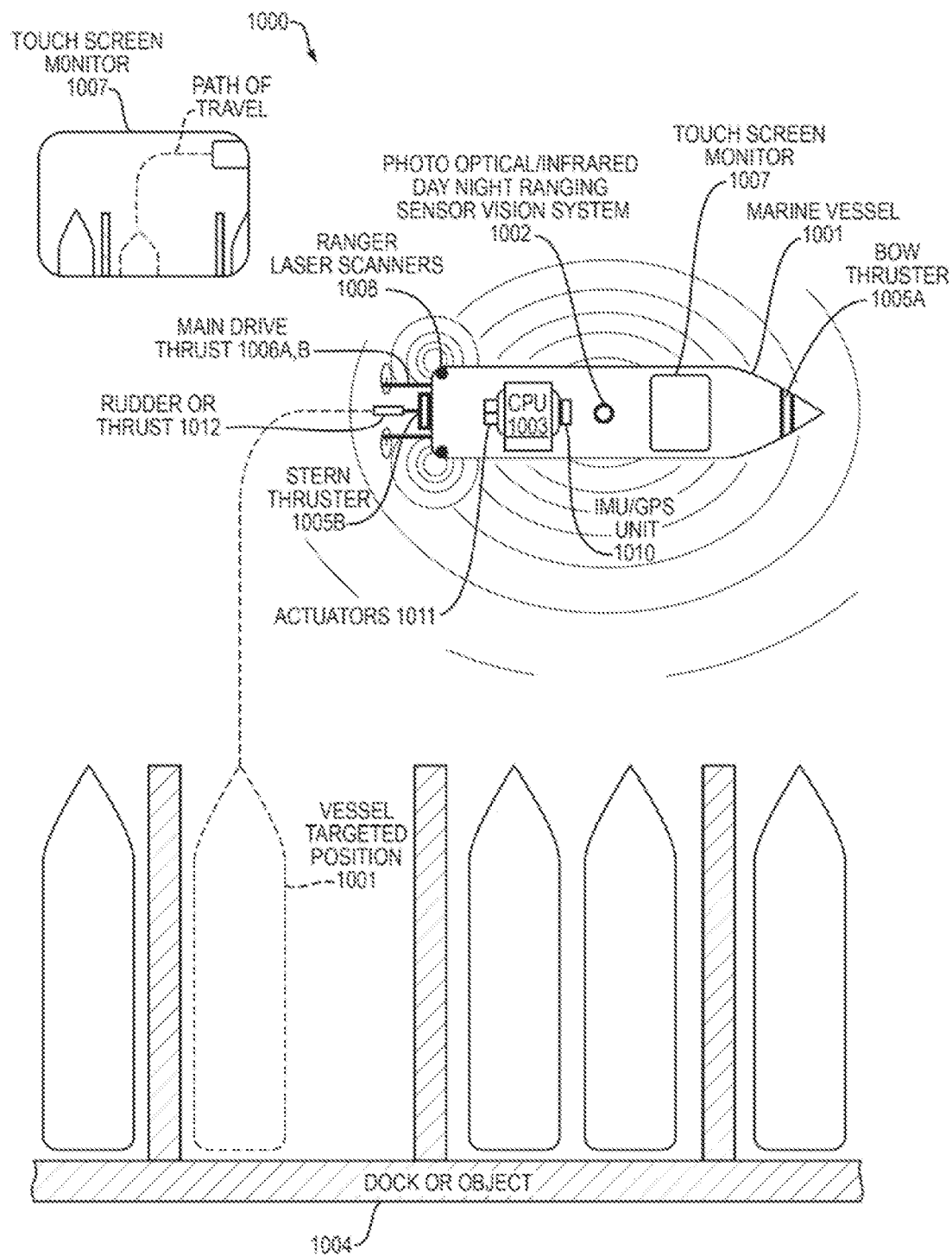
FIG. 10B illustrates an embodiment of an automatic location placement system that automatically positions a marine vessels stern between two external objects.

Referring now to FIG. 10A, the figure illustrates a diagrammatic perspective view of an embodiment of an automatic location placement system. In one aspect, a system 1000 includes an integrated, interactive, automatic location positioning system sensing feedback of a marine vessel's relative position to neighboring surroundings, location, and velocity, along with automatic control of the marine vessel's movement, including velocity and path of travel, to a targeted location relative to an external object. Referring now to FIG. 10B, the figure illustrates an embodiment of an automatic location placement system that automatically positions a marine vessel's stern between two external objects.

Photographic and infrared system capabilities may continuously map the areas surrounding a marine vessel and transmit in real time (or near real time), distance, velocity and visual information between the marine vessel and the surrounding areas to the central processing unit 1003 for use in automatically maneuvering the marine vessel for placement in a final targeted location (e.g., alongside an external object such as a dock 1004) and in maintaining that position automatically.

The system 1000 includes a vision ranging photograph system generating at least one optical feed. The vision ranging photograph system may include vision systems for navigation, which also provide depth information. As will be understood by those of ordinary skill in the art, such systems may include a plurality of cameras mounted at fixed or variable positions (e.g., two cameras per direction).

Optical data (e.g., video) generated by the vision ranging photograph system may be updated periodically. As one example, the optical data may be updated continuously; continuous updates allow the system to provide, via the optical feed, a view of an area that is updated at or near real time. In such an embodiment, the system may be referred to as including a live feed.

The vision ranging photograph system may include the photo optical/infrared day/night ranging sensor vision system 1002. The system 1000 includes at least one infrared vision system, which may be provided by the photo optical/infrared day/night ranging sensor vision system 1002. The photo optical/infrared day/night ranging sensor vision system 1002 may include one or more sub-components. For example, the photo optical/infrared day/night ranging sensor vision system 1002 may include one or more night vision sensors for providing optical (including infrared) feed (e.g., without limitation, video) at night or during other low light or low visibility conditions. The vision ranging photograph system may include one or more cameras mounted at one or more positions on the marine vessel.

The system 1000 includes at least one ranger laser scanner 1008. In one embodiment, the at least one ranger laser scanner 1008 generates a point cloud representing depth information associated with objects in proximity to the at least one ranger laser scanner (and by extension, in proximity to the marine vessel). As will be understood by those of ordinary skill in the art, such a sensor may be referred to as a scanning range finder. As will be discussed in additional detail below, the at least one ranger laser scanner 1008 may include functionality for hazard detection. As will be understood by those of ordinary skill in the art, one or more 270-degree LASER scanners may provide the functionality of the vision ranging photograph system, such as, by way of example, a ranging sensor of the type manufactured by Hokuyo Automatic Co., Ltd., of Osaka, Japan, or by Velodyne LiDAR of Morgan Hill, Calif.

The system 1000 includes at least one inertial measurement unit (IMU). The system 1000 includes at least one global positioning system (GPS) unit. The inertial measurement unit and the global positioning system unit may be provided as a single unit 1010. The inertial measurement unit and the global positioning system unit may be provided as separate components.

The IMU may provide acceleration information; for example, the IMU may provide information (e.g., measurements) in an X, Y, Z axis; the current angular rate of the marine vessel in X, Y, and Z coordinates. The central processing unit 103 may apply a fusion algorithm to measurements received from the IMU. As will be understood by one of ordinary skill in the art, the IMU may be provided by inertial sensors of any form or type, including, by way of example, those manufactured by Robert Bosch GmbH of Germany.

The GPS may provide global coordinates of the marine vessel, including, for example, longitude and altitude. The central processing unit 103 may use the GPS data in conjunction with other received input when applying a sensor fusion algorithm to generate the underlying mapping or an overlay to the mapping. In some embodiments, using GPS data may result in improved precision of a location estimate the system uses to position the marine vessel. The GPS may be any form or type including, by way of example, those manufactured by SparkFun Electronics of Niwot, Colo., or by Garmin International, Inc., of Olathe, Kans.

The system 1000 includes a touch screen monitor 1007. The touch screen monitor 1007 may be in communication with the central processing unit 1003, receiving, for example, data from the optical feed for display to a user. The touch screen monitor 1007 may include a touch capacitive screen allowing a user to interact with a graphical user interface displayed by the touch screen monitor 1007 by touching a screen of the touch screen monitor 1007. The touch screen monitor 1007 may display an overlay of the geometries of an environment surrounding the marine vessel, the overlay generated from data received over the optical feed from the vision system by using optical ranging photography with a day or night all-weather infrared vision system as well as the high precision inertial measurement units (IMUs) and global positioning system (GPS) unit to initiate a variety of automatic functions over various distances through a central processing unit (CPU) 1003 designed to execute selected automatic functions in response to acquired data. The touch screen monitor 1007 provides functionality allowing a user to interact with the system; as a result, the touch screen monitor may be referred to as an interactive touch screen monitor.

The system 1000 includes a propulsion system of a marine vessel 1001 including at least one thruster, at least one drive system, and at least one actuator. The at least one thruster may be a bow thruster 1005A. The at least one thruster may be a stern thruster 1005B. The at least one drive system may be a main drive thrust 1006A. A marine vessel has a steering system (1012) including a rudder or mechanism for adjusting a variable direction of thrust controlling the vessel's path of travel.

The system 1000 includes a central processing unit located on the marine vessel and operatively connected to at least one element of the propulsion system. The central processing unit 1003 may include functionality for receiving from the vision ranging photography system, the at least one optical feed, the feed including data providing a mapping of an environment surrounding the marine vessel. The central processing unit 1003 may, for example, receive the optical feed from the vision ranging photography system via a wired or wireless connection. The central processing unit 103 may receive a plurality of inputs from one or more sensors (e.g., from sensors forming part of the vision ranging system), the inputs including video data and LIDAR data; the central processing unit 103 may then use the inputs to derive a map of an area surrounding the marine vessel. The central processing unit 103 may encode free and occupied areas of the map with a probability that an obstacle has been detected in a particular area; for example, the central processing unit 103 may assign a probability within a range (e.g., 0-255) and the higher the probability, the more likely it is that the area contains an obstacle.

The central processing unit 1003 may include functionality for receiving, from the touch screen monitor, target location data. Target location data may include an identification of a target location at which a user wishes an automatic location placement system to dock the marine vessel. By way of example, the touch screen monitor 1007 may determine that a user has touched the touch screen monitor 1007 at a particular point on a touch capacitive screen; the central processing unit 103 may use information identifying a location touched by the user (e.g., a point identified by an X, Y coordinate pair) and identify a physical location associated with a mapping of an environment surrounding the marine vessel.

The central processing unit 1003 may include functionality for directing at least one element of the propulsion system of the marine vessel, to move the marine vessel to the targeted location, using the mapping and the target location data. The functionality provided by the central processing unit 1003 may be referred to as an automatic location placement system.

In some embodiments, the methods and systems described herein relate generally to an automatic location placement system between a powered marine vessel and a dock or external object. An automatic location placement system may incorporate a touch screen interactive monitor displaying an overlay of the geometries of an environment surrounding the marine vessel, over a live feed from a vision system, enabling an operator of the marine vessel to select a targeted location on the touch screen monitor 1007.

It is to be understood that the invention is not limited in its application to the size of marine vessel, type of marine vessel, or the details of construction and to the arrangements of the components set forth in the following description.

Figure 11A:
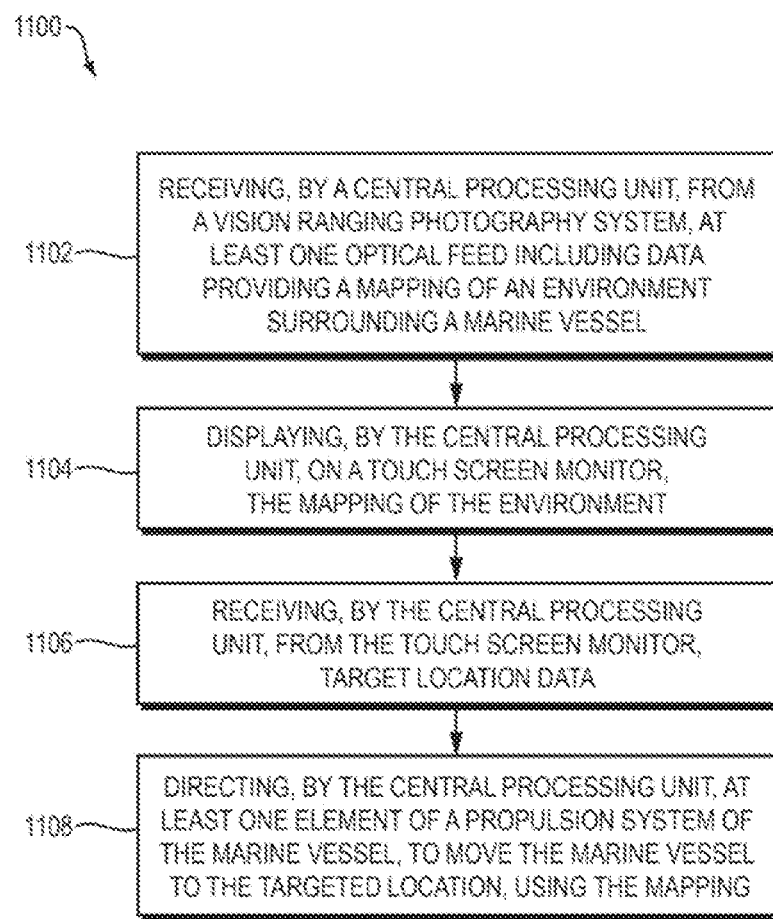
FIG. 11A is a flow diagram depicting one embodiment of a method for automatically moving, by an automatic location placement system, a marine vessel.

Referring now to FIG. 11A, in connection with FIGS. 10A-10B, a method 1100 of automatically moving, by an automatic location placement system, a marine vessel includes receiving, by a central processing unit, from a vision ranging photography system, at least one optical feed including data providing a mapping of an environment surrounding a marine vessel (1102). The method 1100 includes displaying, by the central processing unit, on a touch screen monitor, the mapping of the environment (1104). The method 1100 includes receiving, by the central processing unit, from the touch screen monitor, target location data (1106). The method 1100 includes directing, by the central processing unit, at least one element of a propulsion system of the marine vessel, to move the marine vessel to the targeted location, using the mapping (1108).

The method 1100 includes receiving, by a central processing unit, from a vision ranging photography system, at least one optical feed including data providing a mapping of an environment surrounding a marine vessel (1102). The central processing unit 1003 may receive a plurality of images from the ranging photography system; the central processing unit 1003 may then calculate a level of disparity between each of the plurality of images, resulting in a point cloud representing distances to objects in an area surrounding the marine vessel. In one embodiment, the central processing unit 1003 uses the received data to generate the mapping. In another embodiment, the vision ranging photography system includes functionality for generating the mapping from visual data and providing the mapping to the central processing unit 103.

The central processing unit 1003 may receive, via the optical feed, at least one update of the data providing the mapping of the environment surrounding the marine vessel. For example, the central processing unit 1003 may receive a continuous stream of updates, which the central processing unit 1003 may use to generate a continuously updated mapping.

In some embodiments, the central processing unit 1003 receives, from multiple sources, data associated with the environment surrounding the marine vessel (e.g., sensor data and imaging data). For example, an infrared vision system may operate in situations with low light or low- or zero-visibility; the central processing unit may therefore receive, from the infrared vision system, transmitted data including a second mapping of the environment surrounding a marine vessel. The additional data may also be provided in a continuous (e.g., continuously updated) stream. The additional data may also represent a relation between the marine vessel and the target location adjacent to an external object.

As another example of an embodiment in which the central processing unit 1003 receives optical data from multiple sources, the central processing unit 1003 may receive information from one or more optical laser scanners 1008. The automatic location placement system executed by the central processing unit 1003 may determine a proximity of the marine vessel 1001 to neighboring marine vessels, docks and/or other obstacles using optical laser scanners 1008. For example, and as will be understood by one of ordinary skill in the art, the optical laser scanners may determine a distance between the marine vessel 1001 to the external object 1004 by sending out laser beams and measuring the time of flight (TOF) of the reflected beam coming back to the sensing unit. The scanner may rotate 360° horizontally and several degrees vertically, to provide many of those measurements; based on the TOF, the distance can be precisely calculated.

In some embodiments, while the automatic location placement system is receiving the data from the optical laser scanners 1008, the day-night vision system and optical photo scanners 1002 are recording the same environment visually. The central processing unit 1003 may use the information received from the optical laser scanners 1008 and the day-night vision system and optical photo scanners 1002 to generate a visual representation of the data for display to an operator on the touch screen monitor 1007 (e.g., displaying a "live," or substantially real-time, video feed).

In some embodiments, the central processing unit 1003 applies a sensor fusion algorithm to integrate inputs received from a plurality of sensors (e.g., from sensors forming part of the optical laser scanners 1008 and the day-night vision system and optical photo scanners 1002 and any other sources of data associated with the environment surrounding the marine vessel); the result of such an integration is a multi-dimensional array of measurements (which may be referred to as a "point cloud"). In one of these embodiments, the sensor fusion algorithm uses different filters to combine data received from sensors (including the IMU and the GPS) into one map and filters out faulty reflections (e.g., waves, water surface, etc.). For the creation of the occupancy grid-map, in another of these embodiments, the method 1100 may include the application of probabilistic approaches and multi-resolution scan-matching to complete a map useful in path planning.

Referring still to FIG. 11A, the method 1100 includes displaying, by the central processing unit, on a touch screen monitor, the mapping of the environment (1104). The central processing unit 1003 may forward the mapping or the optical feed data or both to the touch screen monitor 1007. The touch screen monitor 1007 may display the mapping of the environment (e.g., to an operator of the marine vessel 1001). The central processing unit 1003 may generate an overlay of the geometries of environment surrounding the marine vessel 1001 for display by the touch screen monitor 1007, using data received over the optical feed of vision system. The touch screen monitor 1007 may display the surrounding environment in relation to the marine vessel and the targeted location adjacent to the external object. In embodiments in which the central processing unit 1003 received optical data from multiple sources (e.g., from an infrared vision system as well as from other sources), the touch screen monitor 1007 may display output received from each of the other multiple sources as well (e.g., as overlays over the initial mapping). In an embodiment in which the central processing unit 1003 received a second mapping, the touch screen monitor 1007 may display the second mapping as well.

The method 1100 includes receiving, by the central processing unit, from the touch screen monitor, target location data (1106). The touch screen monitor 1007 may generate a graphical user interface and allow the operator to interactively specify the target location of the marine vessel 1001 by touching a user interface element displayed in the graphical user interface, where the user interface element is located at a position corresponding to the target location or otherwise indicates the target location. The touch screen technology may allow for intuitive and versatile yet simple input to designate a targeted location for the marine vessel 1001. For example, the touch screen monitor 1007 may display a video (continuously updated) of the area surrounding the marine vessel 1001 (including, for example, any docks or other external objects 104) and the operator may touch the screen at a position in the video display at which she would like the marine vessel 1001 positioned. The position may be a position relative to a single external object (e.g., a dock) or relative to a plurality of external objects (e.g., at a slip between two portions of a dock or between two other marine vessels). The method 1100 may derive the target location data from the position touched by the operator.

The target location data may specify a location adjacent to an external object. The target location data may include an identification of a targeted location for the marine vessel, the targeted location being between two aft external objects.

When the location is targeted on the touch screen monitor 1007, the optical feed of vision ranging and infrared vision systems map the marine vessel's stern-surrounding environment and transmit data to the central processing unit 1003 for rendering, on the touch screen monitor 1007, a mapping showing the marine vessel's stern surrounding environment and the targeted location between one or more external objects. In one embodiment, when a targeted location is entered on the touch screen monitor 1007, the central processing unit 1003 engages two 270 degree ranging laser scanners which transmit the surrounding environment information back to the central processing unit 1003. The central processing unit 1003 may update a previously generated point cloud as it receives additional sensor input from the cameras.

In one embodiment, the central processing unit 1003 validates a targeted location identified in the target location data to confirm that the targeted location is large enough to accommodate the marine vessel. For example, the automatic location placement system may calculate one or more dimensions of the targeted location, confirming the targeted location area is sufficient to accommodate the dimensions of the marine vessel. The central processing unit 1003 may validate the operator's input and match the input with the mapping generated by the optical ranging sensors 1002.

The method 1100 includes directing, by the central processing unit, at least one element of a propulsion system of the marine vessel, to move the marine vessel to the targeted location, using the mapping (1108). The central processing unit 1003 may automatically provide the at least one element of the propulsion system of the marine vessel, a path of travel to the selected targeted location, upon receiving the targeted location data from the touch screen monitor 1007. The central processing unit 1003 may automatically control at least one steering system of the marine vessel to move the marine vessel into the targeted location, upon receiving the targeted location data from the touch screen monitor 1007. Upon receiving the targeted location data from the touch screen monitor 1007, the central processing unit 1003 may automatically control at least one drive system of the marine vessel 1001 to steer the marine vessel 1001 into the targeted location, engaging the thrusters 1005A and 1005B and main drive thrusters 1006A and 1006B, while controlling the vessel's steering system if and when required in order to move the marine vessel 1001 on the quickest possible controlled path of travel to the targeted location, as described in greater detail below.

Figure 11B:
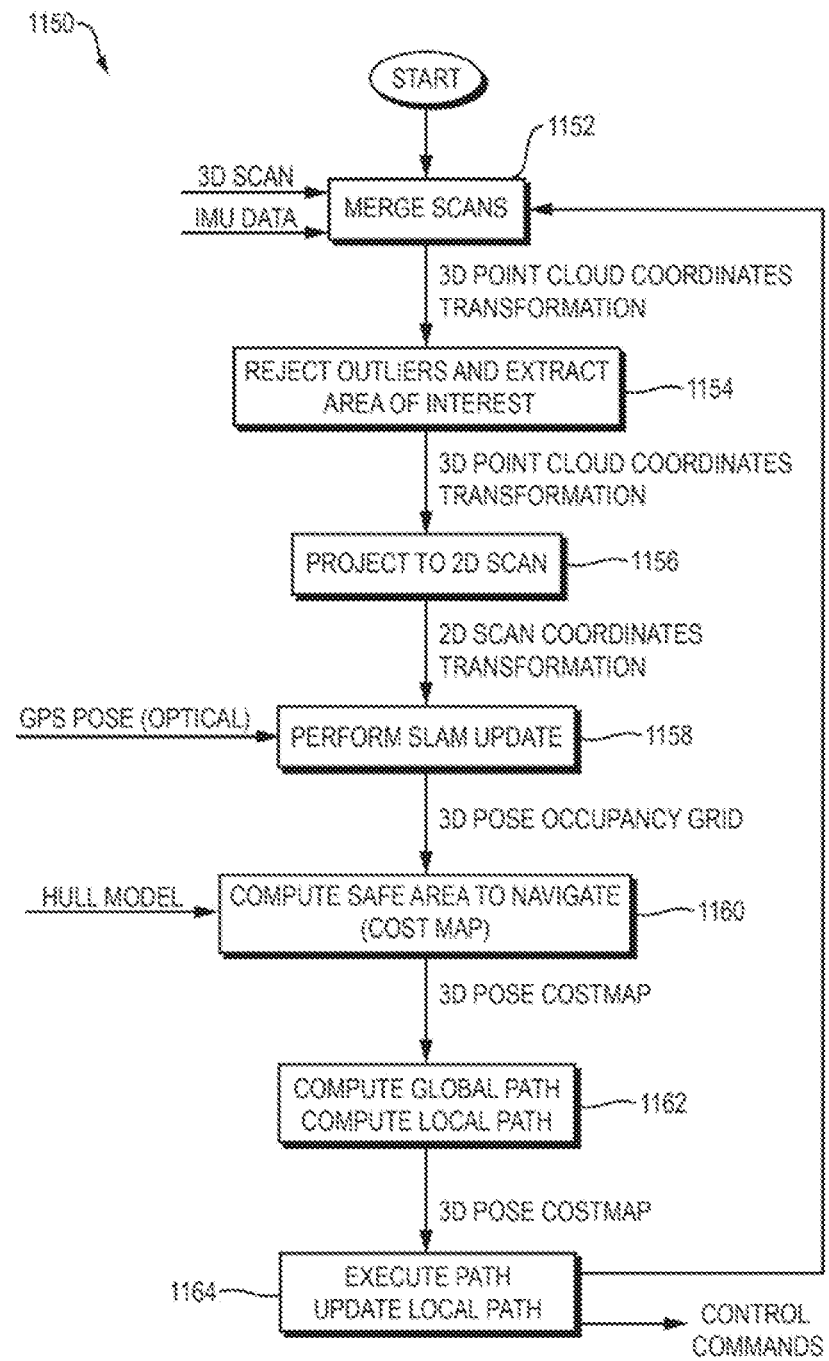
FIG. 11B is a flow diagram depicting one embodiment of a method for determining a path of travel.

Referring ahead to FIG. 11B, a flow diagram depicts one embodiment of a method 1150 for determining a path of travel. The central processing unit 1003 may update the mapping and any overlays before determining a path of travel. The central processing unit 1003 may determine a position of the marine vessel (e.g., in relation to the target location). Location information of the marine vessel 1001 may constantly be transferred (e.g., from the GPS) to the central processing unit 1003 which responds by controlling vessel's steering system if, and when required, to maintain the vessel's path of travel to the targeted location selected on the interactive monitor; the central processing unit 1003 may receive periodic updates to the location information. The central processing unit 1003 may perform one or more updates, incorporating any obstacle-related data, and then compute one or more paths. In one embodiment, to detect the location of the marine vessel 1001, the central processing unit 1003 receives GPS position and a scan of an area surrounding the marine vessel 1001 (e.g., from the photographic vision system 1002 and 1008); the central processing unit 1003 calculates a travel distance and angle to an obstacle (e.g., the closest obstacle) and generates a mapping of desired parking location relative to marine vessel 1 location (x-position, y-position, relative angle).

As shown in FIG. 11B, the method 1150 includes merging scans (e.g., data from one or more scanning systems, from the GPS, and/or from the IMU) (1152). This merger may result in generation or updating, by the central processing unit 1003, of a 3D point cloud (including, e.g., a 3D point cloud coordinate transformation). The method 1150 includes refinement of the 3D point cloud (1154), which may include rejection of outliers and extraction of an area of interest; this may include another 3D point cloud coordinate transformation. The method 1150 includes generation of a 2D scan projection (1156), which may include a 2D scan coordinate transformation. The method 1150 includes performance of a slam (e.g., simultaneous localization and mapping) update (1158), which may include generation of a 3D pose occupancy grid and incorporation of GPS pose data (including, without limitation, latitude, longitude, and altitude). Fusing the data from the GPS with data from other sensors may improve accuracy. The method 1150 includes computation of a safe area in which to navigate, incorporate data associated with a model of a hull of the marine vessel (1160). This may include generation of a 3D pose costmap. The method 1150 includes computation of a global path and a local path (1162). This may include generation or updating of a 3D pose costmap. The method 1150 includes execution of the path and updating the local path (1164).

Referring back to FIG. 11A, the central processing unit 1003 may calculate a path of movement of the marine vessel, incorporating information about one or more obstacles detected by a LIDAR hazard detection and avoidance systems. The central processing unit 1003 may engage at least one aft ranger laser scanner and may receive from the at least one aft ranger laser scanner 1008, data including at least one of distance, velocity, and dimensional area information. The automatic location placement system may include a Light Detection and Ranging (LIDAR) hazard detection and avoidance system, using input from the at least one aft ranger laser scanner 1008. In one embodiment, the LIDAR hazard detection and avoidance system performs data fusion on sensor-level data. For example, the LIDAR hazard detection and avoidance system may reconstruct a point cloud obtained from a scanning LIDAR unit (e.g., as part of the vision ranging photograph system) using navigation motion states and correcting the image for motion compensation using IMU data, obtained from consecutive LIDAR images, to achieve high accuracy and resolution maps while enabling relative positioning. In another embodiment, the LIDAR hazard detection and avoidance system performs data fusion on decision-level data (e.g., fusing hazard maps from multiple sensors onto a single image space, with a single grid orientation and spacing).

Having determined the position of the marine vessel 1001 and calculated at least one path, the central processing unit 103 may then calculate the required directional torque values for every individual thruster mounted on the marine vessel 1001. The required forces and torques at time t may be controlled and calculated by a PID algorithm based on the following formula:

$$T = P\dot{\eta}(t) + D \cdot v(t) + I \cdot \int_0^t \eta(s)ds$$

For:
$\eta$=location
$v$=Velocity

The marine vessel 1001 location, necessary for the control algorithm, may be computed based on the acquired sensor data as well based on GPS 1010 information provided from the GPS 1010 device. PID parameters are gathered during an initial teach-in of the system, which is part of the initial installation procedure for the system.

The total amount of required directional force is then allocated to the individual thrusters 1005A and 1005B due to the fact that every thruster has different timing behavior as well as maximum possible force limitations. The goal of this part of the algorithm is to keep all thrusters 5A and 5B within the range of optimal operation. The following optimization may be calculated:

$$\|T - T_{thruster}\|_2^2 \to \min$$

$$T_{thruster} = \begin{pmatrix} 1 & 1 & 0 & 0 \\ 0 & 0 & 1 & 1 \\ -ly1 & -ly2 & -lx3 & -lx4 \end{pmatrix} \cdot \begin{pmatrix} x_1 \\ x_2 \\ x_3 \\ x_4 \end{pmatrix}$$

$$|x_i| \le x_{max}$$

Propeller 6A and Propeller 6B are main drive thrusters (provide thrust in fore and aft direction) mounted in aft position on marine vessel 1001; they are referred to in above optimization formula as ($-ly_1$, $-ly_2$). Thruster 1005A, bow and Thruster 1005B, stern are side movement thrusters mounted in (fore) position and (aft) position on the marine vessel 1001; they are referred to in optimization formula as ($-lx_3$ and $-lx_4$). They are responsible for generating thrust in a side direction. Values are calculated in this step may be limited to make sure values are within the specification of the used thrusters, which will guarantee for a stable control behavior.

In some embodiments, based on the location of the marine vessel 1001 location, the central processing unit 1003 determines at least one directional torques and a required torque per drive on the marine vessel 1001. Based on the location of the marine vessel 1001 location, the central processing unit 1003 generates an actuator 1011 signal for at least one individual drive. The central processing unit 1003 evaluates movement of the marine vessel 1001.

The central processing unit may engage a thruster of the marine vessel 1001. The central processing unit may engage a drive system of the marine vessel 1001. The central processing unit 1003 may determine to engage a plurality of elements of the propulsion system of the marine vessel substantially simultaneously. For example, the central processing unit 1003 may engage drive systems and thrusters to automatically move the marine vessel to the targeted location as preselected on the touch screen monitor relating to a final location between the two said external objects.

The central processing unit may determine an instruction to provide to the at least one element in response to the received mapping. By way of example, the CPU 1003 may transmit a signal representing a desired rudder angle or thrust angle to the steering control system, which responds, thus achieving motion of the marine vessel along a desired path of travel to the target location selected on interactive monitor to the targeted location.

In some embodiments, during the movement of the marine vessel 1001 and when the marine vessel 1001 is positioned at the final location, the central processing unit 1003 continuously evaluates the sensor data received from the optical sensors 1002 as well as the high precision inertial measurement units (IMUs) and (GPS) units 1010. In one embodiment, the central processing unit 1003 directs at least one element of a propulsion system of the marine vessel to maintain a location of the marine vessel at the targeted location. For example, once the final location is reached, the central processing unit 2003 may operate one or more actuators 1011 as required to control all thrust systems in order to maintain the marine vessel's 1001 location.

Manual interference during automatic operation may result in an immediate disengagement of the automatic system. The central processing unit 1003 may detect that a human operator has manually interfered with operation of the marine vessel; the central processing unit 1003 may then disengage the automatic location placement system, based upon the detection of manual interference.

The automatic location placement system operates independently and without the use or requirement of any human operators upon initiation of the automatic location placement system.

Figure 12A:
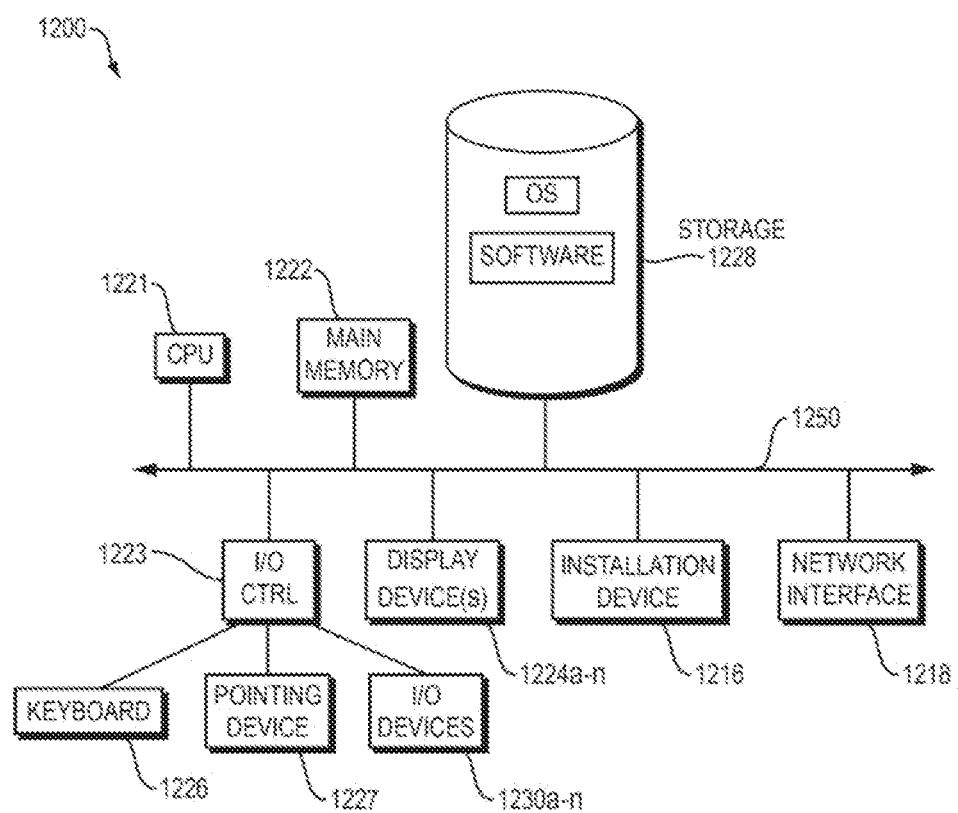
FIGS. 12A-12B are diagrams of computers that may be used to implement embodiments of the present invention.
Figure 12B:
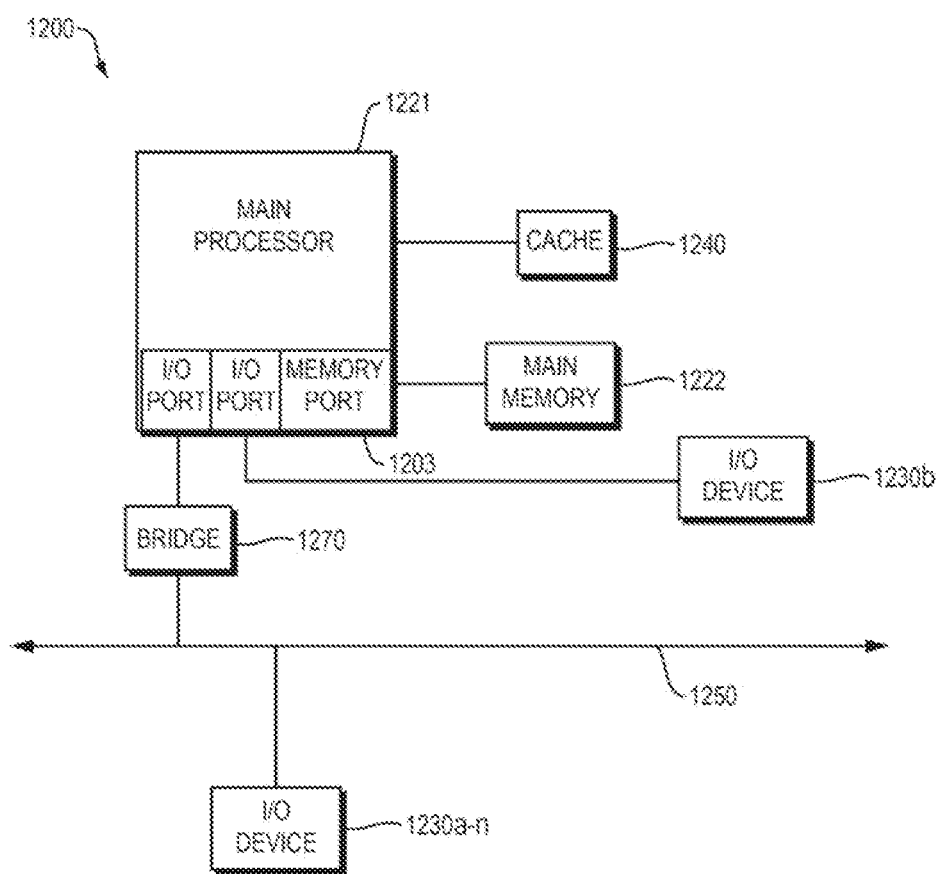

FIGS. 12A and 12B depict block diagrams of a computing device 1200 useful for practicing an embodiment of the CPU 1003. As shown in FIGS. 12A and 12B, a computing device 1200 includes a central processing unit 1221, and a main memory unit 1222. As shown in FIG. 12A, a computing device 1200 may include a storage device 1228, an installation device 1216, a network interface 1218, an I/O controller 1223, display devices 1224*a-n*, a keyboard 1226, a pointing device 1227, such as a mouse, and one or more other I/O devices 1230*a-n*. The storage device 1228 may include, without limitation, an operating system and software. As shown in FIG. 12B, each computing device 1200 may also include additional optional elements, such as a memory port 1203, a bridge 1270, one or more input/output devices 1230*a*-1230*n* (generally referred to using reference numeral 1230), and a cache memory 1240 in communication with the central processing unit 1221.

The central processing unit 1221 is any logic circuitry that responds to and processes instructions fetched from the main memory unit 1222. In many embodiments, the central processing unit 1221 is provided by a microprocessor unit such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 1200 may be based on any of these processors, or any other processor capable of operating as described herein.

Main memory unit 1222 may be one or more memory chips capable of storing data and allowing any storage location to be directly accessed by the microprocessor 1221. The main memory unit 1222 may be based on any available memory chips capable of operating as described herein. In the embodiment shown in FIG. 12A, the processor 1221 communicates with main memory unit 1222 via a system bus 1250. FIG. 12B depicts an embodiment of a computing device 1200 in which the processor communicates directly with main memory unit 1222 via a memory port 1203. FIG. 12B also depicts an embodiment in which the main processor 1221 communicates directly with cache memory 1240 via a secondary bus, sometimes referred to as a backside bus. In other embodiments, the main processor 1221 communicates with cache memory 1240 using the system bus 1250.

In the embodiment shown in FIG. 12A, the processor 1221 communicates with various I/O devices 1230 via a local system bus 1250. Various buses may be used to connect the central processing unit 1221 to any of the I/O devices 1230, including an ISA bus, an EISA bus, a PCI bus, a PCI-X bus, or a PCI-Express bus. For embodiments in which the I/O device is a video display device 1224, the processor 1221 may use an Advanced Graphics Port (AGP) to communicate with the display device 1224. FIG. 12B depicts an embodiment of a computing device 1200 in which the main processor 1221 also communicates directly with an I/O device 1230*b* via, for example, HYPERTRANSPORT, RAPIDIO, or INFINIBAND communications technology.

A wide variety of I/O devices 1230*a*-1230*n* may be present in the computing device 1200. Input devices include keyboards, mice, trackpads, trackballs, microphones, scanners, cameras, and drawing tablets. Output devices include video displays, speakers, inkjet printers, laser printers, and dye-sublimation printers. The I/O devices may be controlled by an I/O controller 1223 as shown in FIG. 12A. Furthermore, an I/O device may also provide storage and/or an installation medium 1216 for the computing device 1200. In some embodiments, the computing device 1200 may provide USB connections (not shown) to receive handheld USB storage devices such as the USB Flash Drive line of devices manufactured by Twintech Industry, Inc. of Los Alamitos, Calif.

Referring still to FIG. 12A, the computing device 1200 may support any suitable installation device 1216, such as a CD-ROM drive, a CD-R/RW drive, a DVD-ROM drive, tape drives of various formats, USB device, hard drive or any other device suitable for installing software and programs. The computing device 1200 may further comprise a storage device, such as one or more hard disk drives or redundant arrays of independent disks, for storing an operating system and other software.

Furthermore, the computing device 1200 may include a network interface 1218 to interface to a network connection to one or more other computing devices (not shown) through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.15.4, BLUETOOTH, ZIGBEE, CDMA, GSM, WiMax, and direct asynchronous connections). In one embodiment, the computing device 1200 communicates with other computing devices via any type and/or form of gateway or tunneling protocol such as Secure Socket Layer (SSL) or Transport Layer Security (TLS). The network interface 1218 may comprise a built-in network adapter, network interface card, PCMCIA network card, card bus network adapter, wireless network adapter, USB network adapter, modem, or any other device suitable for interfacing the computing device 1200 to any type of network capable of communication and performing the operations described herein.

Any of the I/O devices 1230a-1230n and/or the I/O controller 1223 may comprise any type and/or form of suitable hardware, software, or combination of hardware and software to support, enable or provide for the connection and use of multiple display devices 1224a-1224n by the computing device 1200. One ordinarily skilled in the art will recognize and appreciate the various ways and embodiments that a computing device 1200 may be configured to have multiple display devices 1224a-1224n.

In further embodiments, an I/O device 1230 may be a bridge between the system bus 1250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a Serial Plus bus, a SCI/LAMP bus, a Fibre Channel bus, or a Serial Attached small computer system interface bus.

A computing device 1200 of the sort depicted in FIGS. 12A and 12B typically operates under the control of operating systems, which control scheduling of tasks and access to system resources. The computing device 1200 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, WINDOWS 10, and WINDOWS VISTA, all of which are manufactured by Microsoft Corporation of Redmond, Wash.; MAC OS manufactured by Apple Inc. of Cupertino, Calif.; Red Hat Enterprise LINUX, a Linus-variant operating system distributed by Red Hat, Inc., of Raleigh, N.C.; or Ubuntu, a freely-available operating system distributed by Canonical Ltd. of London, England; or any type and/or form of a UNIX operating system, among others.

The computing device 1200 may have been modified to address challenges arising in a marine environment, including addressing conditions that include increased risk of shock or vibration, or the need to provide additional cooling or power systems isolated from the vessel's main power systems.

The computing device 1200 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways, including applications involving other forms of moving vehicles. Also, it is to be understood that the phraseology and terminology employed herein are for the purpose of description and should not be regarded as limiting.

It is understood that the preceding description is given merely by way of illustration and not in limitation of the invention and that various modifications may be made thereto without departing from the spirit of the invention as claimed.

The invention claimed is:

1. A method for automatically navigating a marine vessel to a lateral position adjacent to a memorized lateral reference point on an external object, the method comprising:
   at a processor control unit:
   receiving information representing a sensed lateral reference point on an external object;
   memorizing the information representing the sensed lateral reference point on the external object as memorized lateral reference point information, whereby the memorized lateral reference point is the same point as the sensed lateral reference point;
   displaying, on an interactive monitor, an environment surrounding the marine vessel, including the memorized lateral reference point;
   receiving, from the interactive monitor, target location data indicating the memorized lateral reference point; and
   automatically directing at least one element of a propulsion system of the marine vessel to automatically navigate the marine vessel to the lateral position adjacent to the memorized lateral reference point on the external object.

2. The method of claim 1, further comprising:
   stopping the marine vessel at the lateral position adjacent to the memorized lateral reference point on the external object; and
   maintaining the marine vessel at the lateral position adjacent to the memorized lateral reference point on the external object.

3. The method of claim 1, further comprising, before receiving the sensed lateral reference point on the external object:
   sensing, using at least one transducer, the sensed lateral reference point on the external object; and
   transmitting information representing the sensed lateral reference point on the external object to the processor control unit.

4. The method of claim 1, wherein receiving the information representing the sensed lateral reference point on the external object comprises receiving the information via a network interface connected to at least one computing device over a network connection.

5. The method of claim 1, wherein the interactive monitor comprises a touch screen monitor.

6. The method of claim 1, wherein automatically directing the at least one element of the propulsion system of the marine vessel comprises:
   sensing, using at least one transducer, the marine vessel's position relative to the external object;
   receiving, by the processor control unit, a set of distance, position, and velocity information relating to distance, position, and velocity between the marine vessel and the external object in real-time; and
   automatically directing, by the processor control unit, the at least one element of the propulsion system of the marine vessel to automatically navigate the marine vessel to the lateral position adjacent to the memorized lateral reference point on the external object at a controlled velocity toward the external object.

7. The method of claim 6, wherein automatically directing the at least one element of the propulsion system of the marine vessel to automatically navigate the marine vessel to the lateral position adjacent to the memorized lateral reference point on the external object at a controlled velocity toward the external object comprises:
   calculating, at the processor control unit, a path of movement of the marine vessel, incorporating information about at least one obstacle detected by a hazard detection and avoidance system;
   determining, by the processor control unit, a required directional force to allocate to the at least one element of the propulsion system of the marine vessel, based upon a current location of the marine vessel relative to the external object; and
   engaging, at the processor control unit, the propulsion system to perform collision-free path planning and automated guided manipulation of the marine vessel to the lateral position adjacent to the memorized lateral reference point on the external object.

8. The method of claim 6, wherein stopping the marine vessel at the lateral position adjacent to the memorized lateral reference point on the external object comprises, at the processor control unit, automatically engaging the propulsion system to reduce the controlled velocity and to stop the marine vessel at the lateral position adjacent to the memorized lateral reference point on the external object.

9. The method of claim 2, wherein automatically directing the at least one element of the propulsion system comprises automatically directing, by the processor control unit, the at least one element of the propulsion system of the marine vessel to automatically navigate the marine vessel to the lateral position adjacent to the memorized lateral reference point on the external object in real-time.

10. The method of claim 2, wherein stopping the marine vessel at the lateral position adjacent to the memorized lateral reference point on the external object comprises, at the processor control unit, automatically engaging the propulsion system to reduce a controlled velocity of the marine vessel and to stop the marine vessel at the lateral position adjacent to the memorized lateral reference point on the external object.

11. A system for automatically navigating a marine vessel to a lateral position adjacent to a memorized lateral reference point on an external object, the system comprising:
   a processor control unit adapted to:
      receive information representing a sensed lateral reference point on an external object;
      memorize the information representing the sensed lateral reference point on the external object as the memorized lateral reference point information, whereby the memorized lateral reference point is the same point as the sensed lateral reference point;
      display, on an interactive monitor, an environment surrounding the marine vessel, including the memorized lateral reference point;
      receive, from the interactive monitor, target location data indicating the memorized lateral reference point; and
      automatically direct at least one element of a propulsion system of the marine vessel to automatically navigate the marine vessel to the lateral position adjacent to the memorized lateral reference point on the external object.

12. The system of claim 11, wherein the processor control unit is further adapted to automatically direct the at least one element of the propulsion system of the marine vessel to:
   stop the marine vessel at the lateral position adjacent to the memorized lateral reference point on the external object; and
   maintain the marine vessel at the lateral position adjacent to the memorized lateral reference point on the external object.

13. The system of claim 11, wherein the processor control unit is further adapted to, before receiving the sensed lateral reference point on the external object:
   sense, using at least one transducer, the sensed lateral reference point on the external object; and
   transmit information representing the sensed lateral reference point on the external object to the processor control unit.

14. The system of claim 13, further comprising the at least one transducer.

15. The system of claim 11, wherein receiving the information representing the sensed lateral reference point on the external object comprises receiving the information via a network interface connected to at least one computing device over a network connection.

16. The system of claim 15, further comprising the network interface.

17. The system of claim 11, wherein the interactive monitor comprises an interactive touch screen monitor.

18. The system of claim 11, wherein the processor control unit is adapted to, as part of automatically directing the at least one element of the propulsion system of the marine vessel:
   sense, using at least one transducer, the marine vessel's position relative to the external object;
   receive a set of distance, position, and velocity information relating to distance, position, and velocity between the marine vessel and the external object in real-time; and
   automatically direct the at least one element of the propulsion system of the marine vessel to automatically navigate the marine vessel to the lateral position adjacent to the memorized lateral reference point on the external object at a controlled velocity toward the external object.

19. The system of claim 18, wherein the processor control unit is adapted to, as part of automatically directing the at least one element of the propulsion system of the marine vessel to automatically navigate the marine vessel:
   calculate, at the processor control unit, a path of movement of the marine vessel, incorporating information about at least one obstacle detected by a hazard detection and avoidance system;
   determine, by the processor control unit, a required directional force to allocate to the at least one element of the propulsion system of the marine vessel, based upon a current location of the marine vessel relative to the external object; and
   engage, at the processor control unit, the propulsion system to perform collision-free path planning and automated guided manipulation of the marine vessel to the lateral position adjacent to the memorized lateral reference point on the external object.

20. The system of claim 18, wherein the processor control unit is adapted to, as part of stopping the marine vessel at the lateral position adjacent to the memorized lateral reference point on the external object:
- automatically engage the propulsion system to reduce the controlled velocity and to stop the marine vessel at the lateral position adjacent to the memorized lateral reference point on the external object.

21. The system of claim 12, wherein the processor control unit is adapted to, as part of automatically directing the at least one element of the propulsion system:
- automatically direct the at least one element of the propulsion system of the marine vessel to automatically navigate the marine vessel to the lateral position adjacent to the memorized lateral reference point on the external object in real-time.

22. The system of claim 12, wherein the processor control unit is adapted to, as part of stopping the marine vessel at the lateral position adjacent to the memorized lateral reference point on the external object:
- automatically engage the propulsion system to reduce a controlled velocity of the marine vessel and to stop the marine vessel at the lateral position adjacent to the memorized lateral reference point on the external object.

23. The system of claim 11, further comprising the at least one element of the propulsion system of the marine vessel.

24. The system of claim 11, further comprising the interactive monitor.

* * * * *

UNITED STATES PATENT AND TRADEMARK OFFICE
CERTIFICATE OF CORRECTION

| | |
|---|---|
| PATENT NO. | : 11,774,971 B2 |
| APPLICATION NO. | : 18/094031 |
| DATED | : October 3, 2023 |
| INVENTOR(S) | : Bradley Tyers |

It is certified that error appears in the above-identified patent and that said Letters Patent is hereby corrected as shown below:

In the Claims

Column 27, Claim 11, Lines 56-57, delete "as the memorized lateral reference point information," and insert --as memorized lateral reference point information,-- therefor Signed and Sealed this
Twelfth Day of December, 2023

Katherine Kelly Vidal
*Director of the United States Patent and Trademark Office*